US012293043B2

United States Patent
Zhou et al.

(10) Patent No.: US 12,293,043 B2
(45) Date of Patent: May 6, 2025

(54) TIME-SYNCHRONIZED PIXEL ARRAY AND TOUCH ARRAY CROSSTALK MITIGATION SYSTEMS AND METHODS

(71) Applicant: Apple Inc., Cupertino, CA (US)

(72) Inventors: Andy J Zhou, Redwood City, CA (US); John B Laflen, Elk Grove, CA (US); Eric S Winokur, Redwood City, CA (US); Joseph W Colosimo, Sunnyvale, CA (US); Steven N Hanna, San Jose, CA (US); Nitya Ramdas, Carlsbad, CA (US); Tyler D Holmes, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/420,596

(22) Filed: Jan. 23, 2024

(65) Prior Publication Data

US 2025/0085811 A1 Mar. 13, 2025

Related U.S. Application Data

(60) Provisional application No. 63/582,038, filed on Sep. 12, 2023.

(51) Int. Cl.
  *G06F 3/041* (2006.01)
  *G06F 3/044* (2006.01)
  *G09G 3/32* (2016.01)

(52) U.S. Cl.
  CPC ........ *G06F 3/04184* (2019.05); *G06F 3/0412* (2013.01); *G06F 3/0418* (2013.01); *G06F 3/044* (2013.01); *G06F 3/0446* (2019.05); *G09G 3/32* (2013.01); *G06F 2203/04104* (2013.01); *G09G 2320/0209* (2013.01); *G09G 2330/021* (2013.01)

(58) Field of Classification Search
  CPC .. G06F 3/0412; G06F 3/04186; G06F 3/0418; G06F 3/0446; G06F 2203/04104; G06F 3/0237; G06F 3/044; G06F 3/04184; G06F 3/0445; G09G 2320/0285; G09G 2320/029; G09G 2320/045; G09G 2320/0209

See application file for complete search history.

(56) References Cited

U.S. PATENT DOCUMENTS

| | | | |
|---|---|---|---|
| 9,285,933 | B2 | 3/2016 | Kim et al. |
| 9,430,088 | B1* | 8/2016 | Lee ................ G06F 3/0443 |
| 11,604,540 | B1 | 3/2023 | Winokur et al. |
| 11,893,185 | B2* | 2/2024 | Latif .............. G06F 3/0445 |

(Continued)

FOREIGN PATENT DOCUMENTS

| KR | 20220093693 A | 7/2022 |
|---|---|---|
| KR | 20230018977 A | 2/2023 |

*Primary Examiner* — Dismery Mercedes
(74) *Attorney, Agent, or Firm* — Fletcher Yoder, P.C.

(57) ABSTRACT

Systems, methods, and devices are described that may mitigate display pixel and touch crosstalk noise. A touch processing system may compensate touch scan data to reduce the noise based on a luminance value. An image processing system may determine the luminance value based on image data and a display brightness value of an electronic display. Using the compensated touch scan data, the touch processing system may determine a proximity of a capacitive object to at least one touch sense region of the electronic display.

20 Claims, 19 Drawing Sheets

(56) References Cited

U.S. PATENT DOCUMENTS

| | | | |
|---|---|---|---|
| 2008/0158145 A1* | 7/2008 | Westerman | G06F 3/04182 382/209 |
| 2011/0298746 A1* | 12/2011 | Hotelling | G06F 3/0446 345/174 |
| 2014/0043281 A1* | 2/2014 | Kim | G06F 3/0418 345/174 |
| 2014/0160062 A1* | 6/2014 | Kim | G02F 1/13338 345/174 |
| 2014/0176495 A1* | 6/2014 | Vlasov | G06F 3/0441 345/174 |
| 2022/0404932 A1* | 12/2022 | Gray | G06F 3/041662 |
| 2023/0093204 A1 | 3/2023 | Latif et al. | |

\* cited by examiner

TIME-SYNCHRONIZED PIXEL ARRAY AND TOUCH ARRAY CROSSTALK MITIGATION SYSTEMS AND METHODS

This application claims priority to and the benefit of U.S. Provisional Application No. 63/582,038, entitled "Time-Synchronized Pixel Array and Touch Array Crosstalk Mitigation Systems and Methods", filed Sep. 12, 2023, which is herein incorporated by reference in its entirety for all purposes.

SUMMARY

This disclosure relates to mitigating crosstalk between display and touch subsystems and, more specifically, to mitigating undesired capacitive interaction between the subsystems.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (µLEDs). By causing different display pixels to emit different amounts of light, individual display pixels of an electronic display may collectively produce images.

An electronic display may include both a display subsystem and a touch subsystem, such as in an integrated panel or system-on-a-chip (SOC). However, these subsystems may experience crosstalk during operation caused by image data being presented. Touch scan data may be modulated by display image content that changes an impedance between the cathode and ground (e.g., alternating current (AC) ground). This impedance may include one or more non-image-dependent components and an OLED/TFT pathway component that is image dependent. Examples of the crosstalk include Impedance-based Display-Touch Crosstalk (Impedance DTX).

With Impedance DTX, image data presented by the display may cause image data-dependent changes in an impedance used when generating a touch sensing signal. Impedance DTX may result in a touch baseline shift where the touch scan data gets modulated by display image content changing cathode impedance a component of the impedance to AC ground as seen from the cathode. Thus, it may be desirable to reduce crosstalk between the display and touch subsystems, and in particular the Impedance DTX.

To compensate for Impedance DTX, a touch sensing system may determine cathode impedance during a touch scan. The cathode impedance may be content dependent and spatially varying. An image processing system may calculate pixel luminance values for a display frame or any other metric that can estimate cathode impedance. The image processing system may transmit the pixel luminance values (APL map) and a global brightness value (DBV) to the touch sensing system. The touch processing system may use the pixel luminance values and the global brightness value to determine a cathode current, which may be used as a proxy for the cathode impedance. Indeed, the touch processing system may use the cathode current to estimate and cancel out the undesired Impedance DTX component of the touch sensing signal.

BRIEF DESCRIPTION OF THE DRAWINGS

Various aspects of this disclosure may be better understood upon reading the following detailed description and upon reference to the drawings described below.

DETAILED DESCRIPTION

Figure 1:
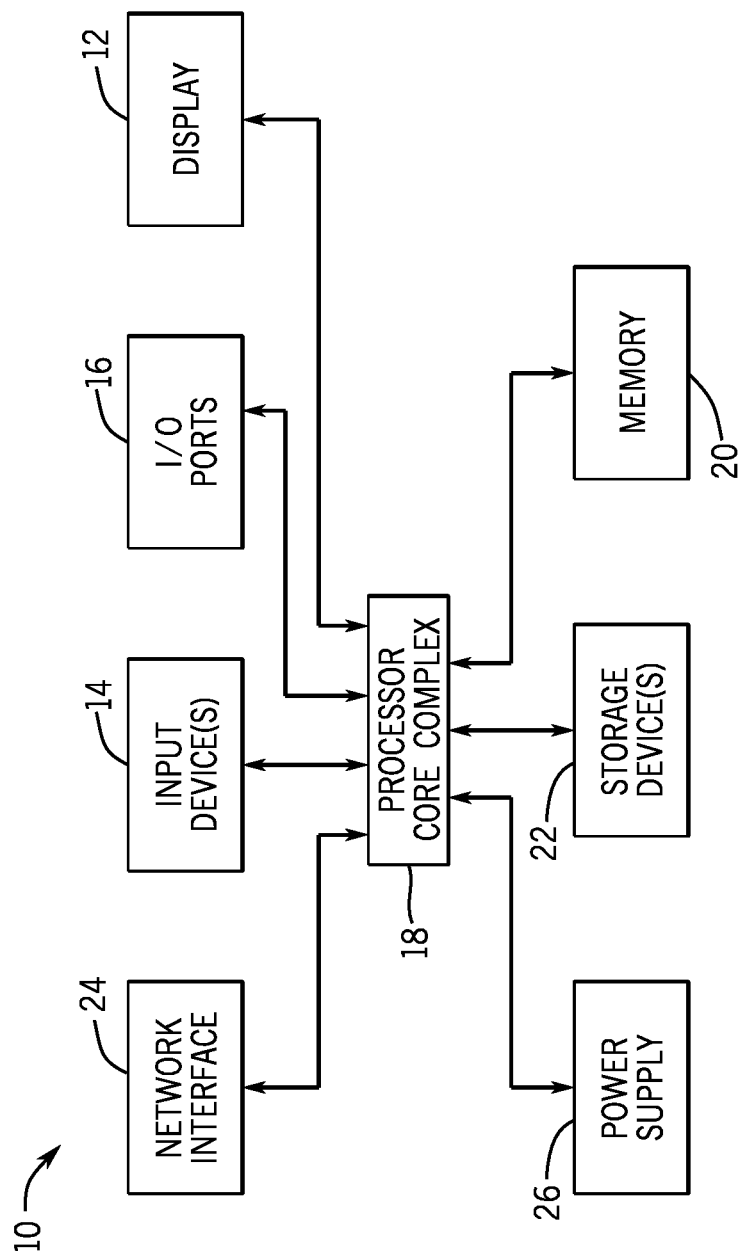
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure provides systems and methods for integrating a touch panel and a display panel into a single panel, which may reduce material costs and to lower component footprints within an electronic display or device. For devices with integrated display and touch subsystems, special care must be taken to avoid crosstalk and noise between the subsystems. Examples of the crosstalk include impedance-based display-touch crosstalk (Impedance DTX), which may change the capacitance sensed and lead to inaccurate touch sensing operations.

Inaccurate or undesired touch sensing operations may lead to lagged response of the electronic device to the tactile input, performance of incorrect operations in response to the tactile input, undesirable results to occur in response to the tactile input, or the like. When undesired operations are performed in response to tactile inputs, computing resources may be spent performing the undesired operations, ending the undesired operations, or correcting the undesired operations in response to further received tactile input. Thus, it may be desirable to mitigate the Impedance DTX to improve user experience with the electronic device, as well as electronic device performance by reducing a likelihood of inefficient allocation of computing resources.

Keeping the foregoing in mind, described herein are systems and methods that may mitigate effects of the Impedance DTX to improve user experience and device performance. Indeed, the systems and methods may use indications of the image data associated with the Impedance DTX to determine and remove an amount of error expected to alter touch scan data. By removing the expected error from the touch scan data, the systems and methods may compensate for the crosstalk.

To compensate for Impedance DTX, a touch sensing system may determine the overall cathode impedance during a touch scan, some components of which may be content dependent and spatially varying. For example, the impedance between a cathode and ground may be content dependent and/or spatially varying. An image processing system may calculate pixel luminance values for a display frame or any other metric that can estimate cathode impedance. The image processing system may transmit statistical data that includes the pixel luminance values and a global brightness value to the touch sensing system, where the global brightness value indicates an overall light intensity of the electronic display, which may be changed by the image processing system in response to ambient light conditions, inputs received to the electronic device, or the like. The touch processing system may use the pixel luminance values and the global brightness value to determine a cathode current, which may be used as a proxy for the cathode impedance when applied to a display-to-touch aggression model. Indeed, the touch processing system may use the cathode current to estimate and cancel out the undesired Impedance DTX component of the touch sensing signal.

Compensating for display pixel-touch crosstalk (e.g., Impedance DTX) may improve device operation. For example, an electronic device compensating for the crosstalk may improve performance of the touch processing subsystem and/or may reduce an amount of power consumed by the touch processing subsystem by mitigating interference associated with the crosstalk. A wide variety of electronic display and tactile input devices may benefit from these operations described herein since these compensation operations may be deployed across a wide range of devices including phones, tablets, watches, desktops, and even other displays with integrated touch and display panels. Moreover, touch performance of the display panel may be quantified by comparing performance while the operations are performed vs. while the operations are not performed. This may enable selective use of the crosstalk compensation operations and further power reductions by compensating for the crosstalk when most appropriate. For example, crosstalk compensation operations may be performed in response to particularly noisy data expected or scheduled to be displayed, in response to periodic timelines or schedules, in response to an input via an input device, or other suitable inputs or signals to trigger performance of the crosstalk compensations.

With the foregoing in mind, systems and methods described herein generate image statistics able to be used to determine an expected Impedance DTX noise (e.g., DTX estimate) to occur while a subset of image data is used to present an image frame on a display. The expected Impedance DTX noise may be computed prior to or concurrently with that corresponding image frame being presented. The image statistics may be communicated from an image processing system to a touch processing system, where timing estimates for an image display time (e.g., on screen timestamp) and a touch scan time (e.g., scan timestamp) are computed to synchronize the image statistics to the touch scan (that occurs during a blanking period of the display after the image frame is rendered). The touch processing system may use a display-to-touch aggression model (e.g., a prediction model) to estimate and remove the Impedance DTX noise from the touch scan based on the image statistics, the expected Impedance DTX noise, and the timing estimates. Indeed, the correction operations to remove at least some noise from the touch scan may occur in response to one or more timing signals associated with the timing estimates.

Furthermore, the display cathode may not change with image data. Rather, an impedance between the cathode and an alternating current (AC) ground may change. This impedance may include one or more non-image-dependent components and one or more image-dependent components. For example, a respective pixel and switch pathway (e.g., OLED and TFT pathway) between the cathode and the AC ground may be an example of an image-dependent impedance. Furthermore, some of the descriptions herein are directed toward Impedance DTX as related to mutual capacitance sensing operations, which may use separate drive and sense touch electrodes. The model of aggression that the described prediction model (e.g., of FIG. 15) uses may be of self-capacitance. In self-capacitance, there may be one or more sense electrodes that are pre-charged and discharged. In other words, the drive and sense electrodes may be shared or computationally modeled as being shared.

In this way, display drive and scan data operations that cause switching noise based on display drive and scan data operations may be presumed quiet and not contributing noise for ease of disclosure. It should be understood that in an actual implementation, noise compensation operations described herein may sometimes include some aspect of compensation operations for Switching DTX and/or switching noise contributions. Moreover, since touch sensing described herein may operate while the display is in a blanking period (e.g., FIG. 21), the display may impact touch scan data through the cathode impedance and blending of image data between different subsequent image frames may not be considered.

Furthermore, when considering timing operations, BSYNC signal may serve to initiate a touch scan. After the touch scan completes, the touch processing may begin with looking in the queue of the touch processing system to identify and read appropriately synchronized set of image statistics from the buffer (e.g., queue).

These described systems and methods may be used by any device with tight integration of display and touch subsystems, such as displays with in-cell or on-cell touch. Other systems, however, may also benefit from using these systems and methods (e.g., non-integrated but spatially nearby display and touch subsystems). With this in mind, an example of an electronic device 10, which includes an electronic display 12 that may benefit from these features, is shown in FIG. 1.

FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4th Generation (4G), Long-Term Evolution (LTE), or 5th Generation (5G) cellular network. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
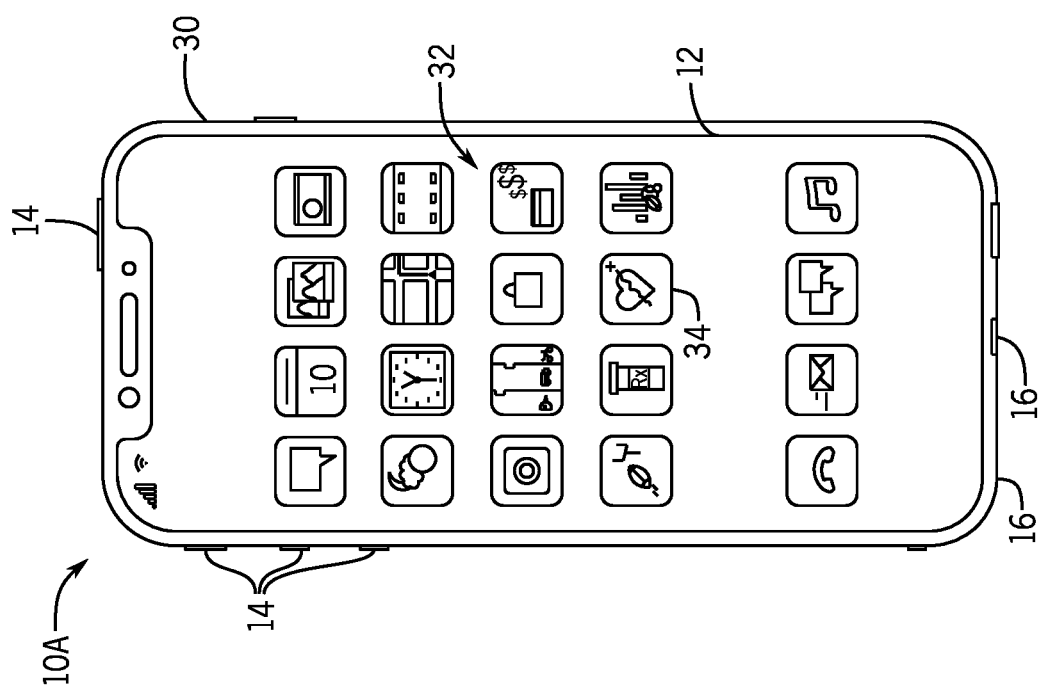
FIG. 2 is a front view of a mobile phone representing an example of the electronic device of FIG. 1, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
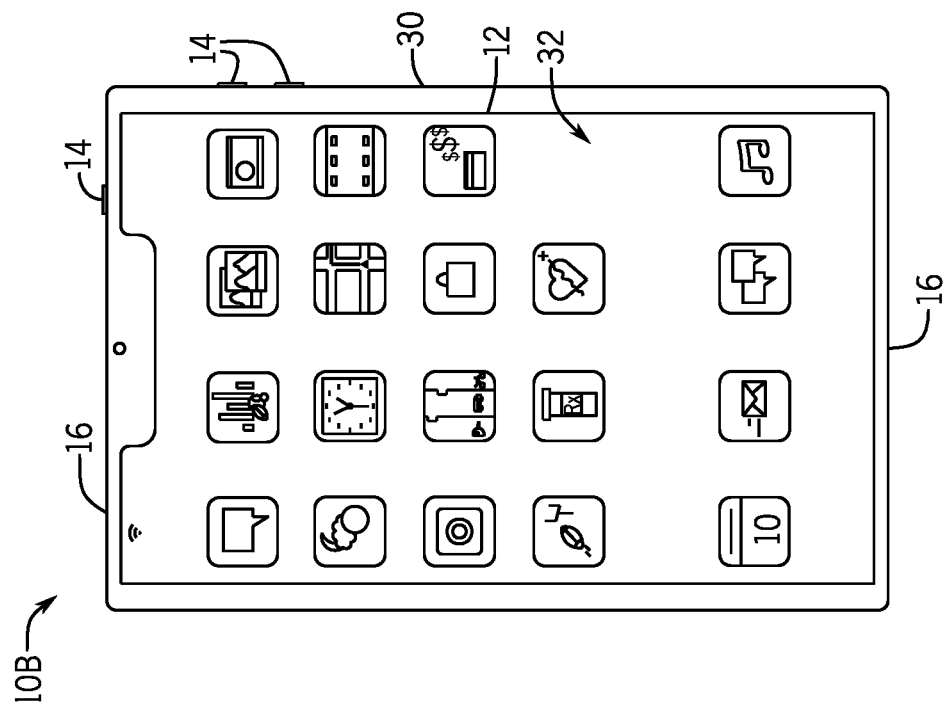
FIG. 3 is a front view of a tablet device representing an example of the electronic device of FIG. 1, in accordance with an embodiment.
Figure 4:
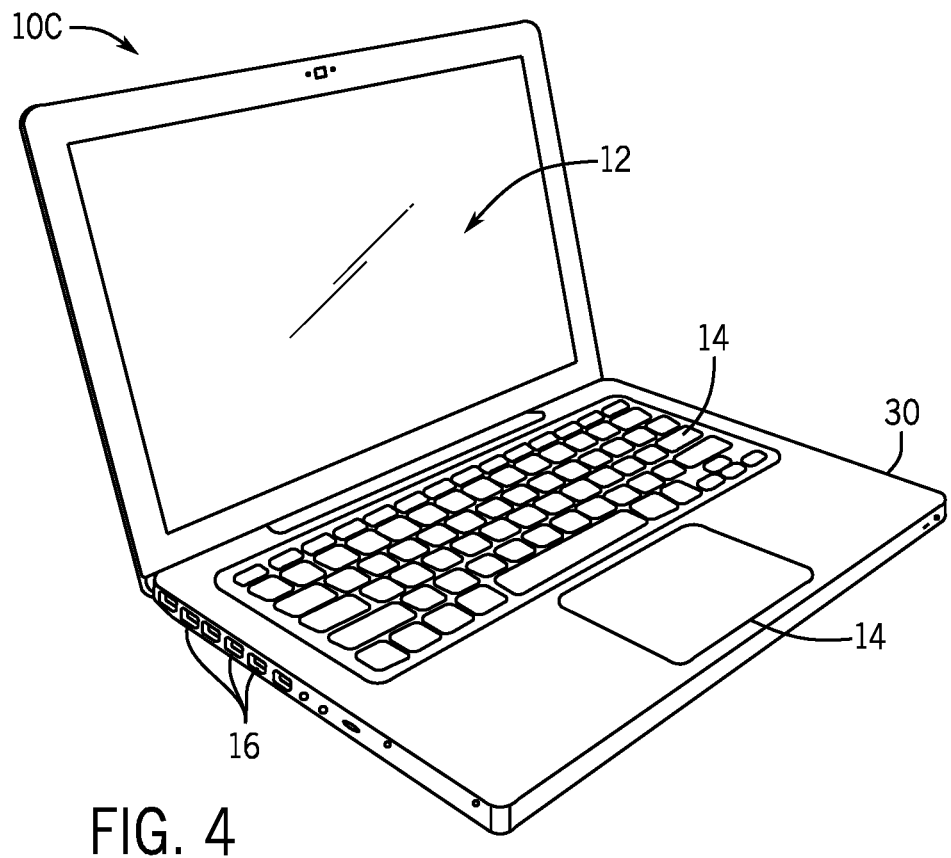
FIG. 4 is a front view of a notebook computer representing an example of the electronic device of FIG. 1, in accordance with an embodiment.
Figure 5:
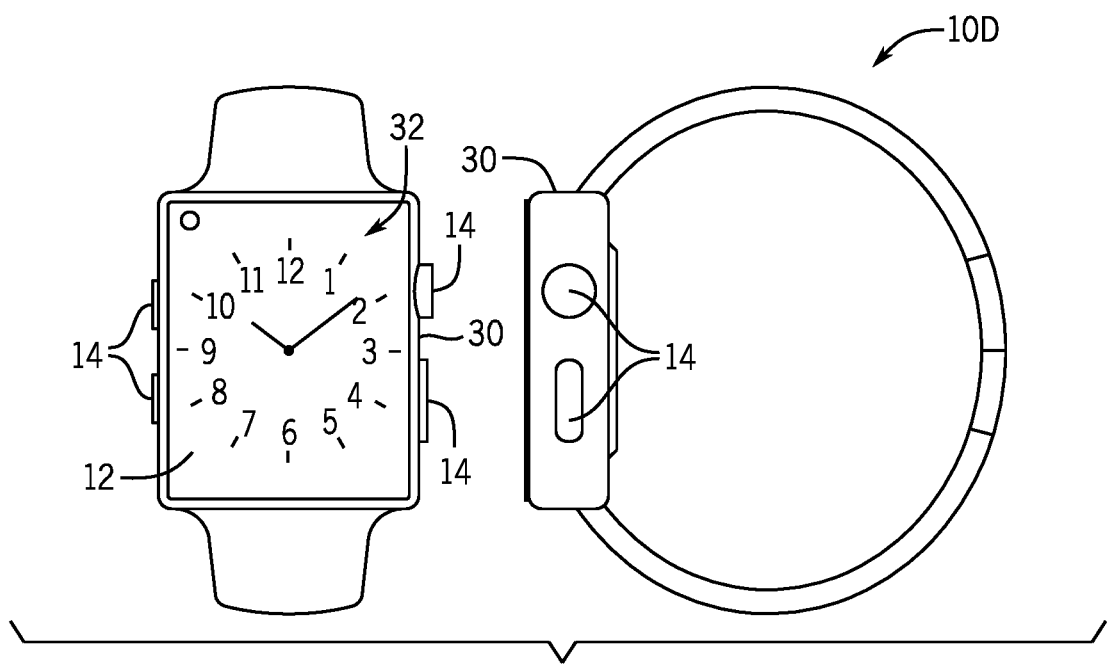
FIG. 5 are front and side views of a watch representing an example of the electronic device of FIG. 1, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 includes front and side views of the watch 10D representing an example of the electronic device 10. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
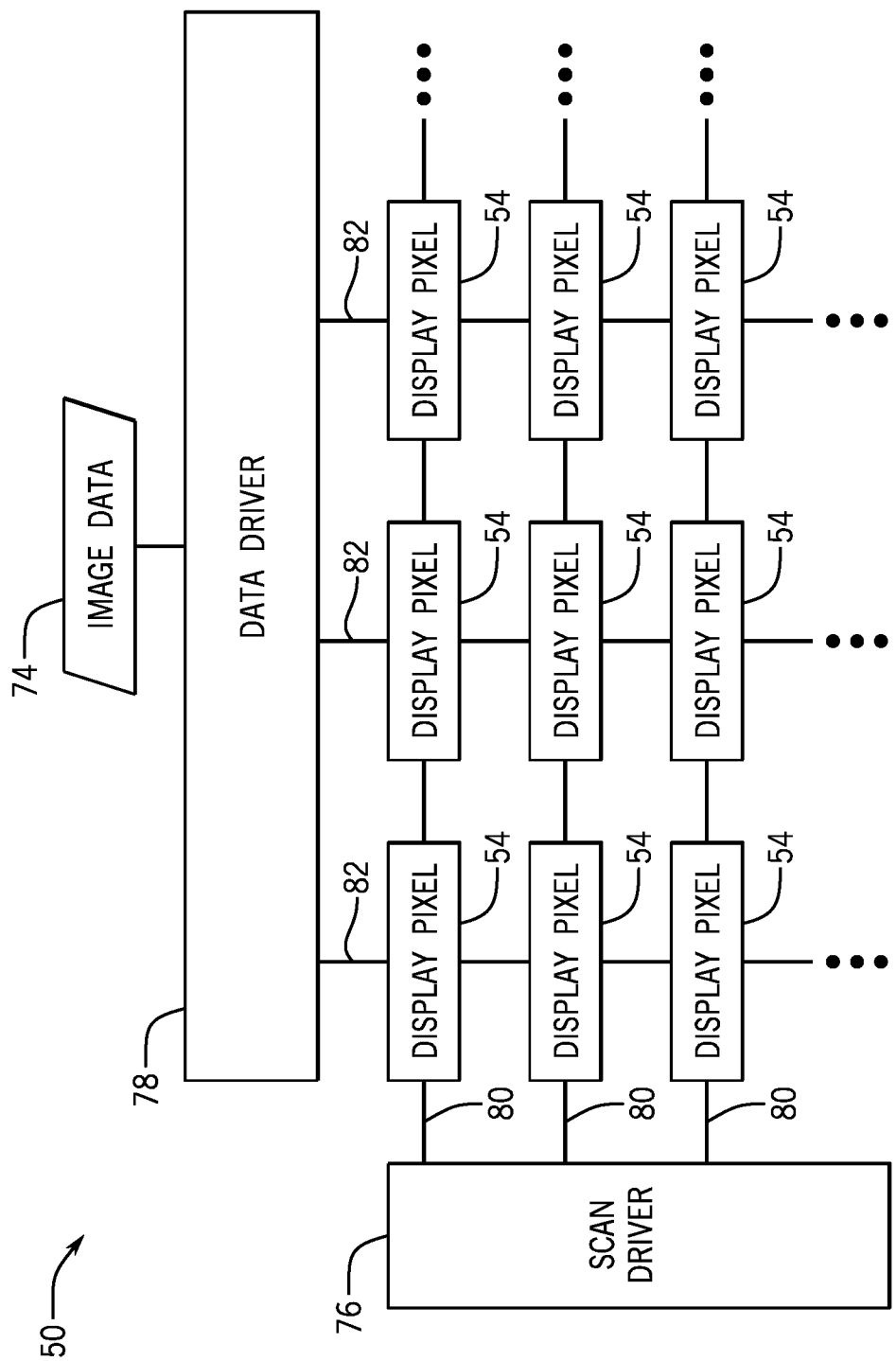
FIG. 6 is a block diagram of a display pixel array of the electronic display of FIG. 1, in accordance with an embodiment.

Keeping the foregoing in mind, FIG. 6 is a block diagram of a display pixel array 50 of the electronic display 12. It should be understood that, in an actual implementation, additional or fewer components may be included in the display pixel array 50.

The electronic display 12 may receive image data 74 for presentation on the electronic display 12. The electronic display 12 includes display driver circuitry that includes scan driver circuitry 76 and data driver circuitry 78. The display driver circuitry controls programing the image data 74 into the display pixels 54 for presentation of an image frame via light emitted according to each respective bit of image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (µLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red (R) light, some may emit green (G) light, and some may emit blue (B) light. The display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the image data 74 from data lines 82 from the data driver circuitry 78. In this way, an image frame of image data 74 may be programmed onto the display pixels 54 row by row. Other examples of the electronic display 12 may program the display pixels 54 in groups other than by row. In some cases, touch scanning operations may occur while drivers are off or idle (e.g., quiet).

Figure 7:
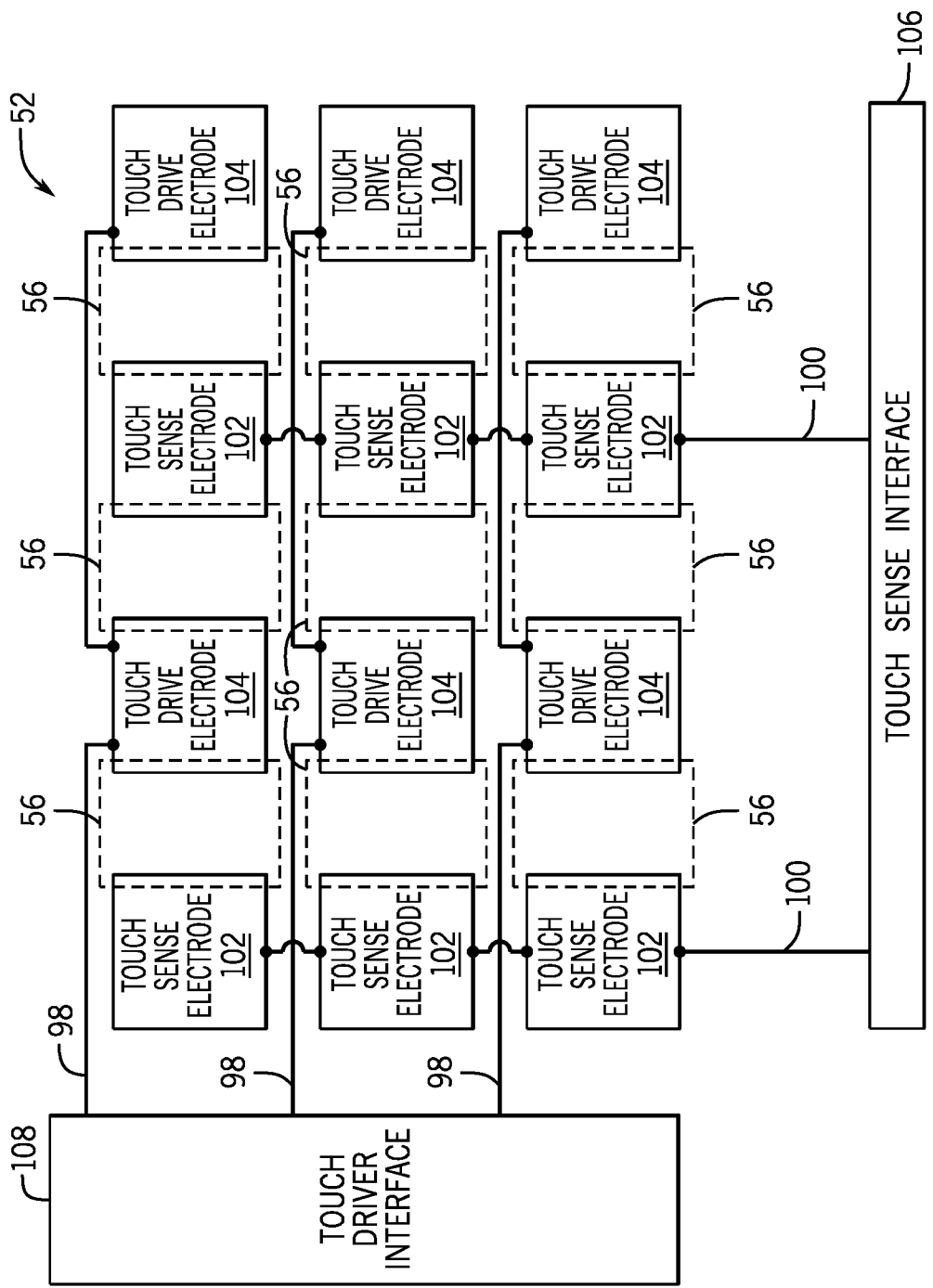
FIG. 7 is a block diagram of a touch sensor array of the electronic display of FIG. 1, in accordance with an embodiment.

The display pixel array 50 operates differently than the touch sensor array 52. Referring now to operations of the touch sensor array 52, FIG. 7 is a block diagram of the touch sensor array 52 of the electronic display 12. The touch sensor array 52 and the display pixel array 50 may be integrated and disposed onto a same component, a silicon chip, a board, or the like.

The touch sensor array 52 includes touch sense regions 56 (e.g., any sized matrix of touch sense regions 56) formed by interactions between touch drive electrodes 104 driven via conductive lines 98 and touch sense electrodes 102 sensed via conductive lines 100. It should be noted that the terms "lines" and "electrodes" as sometimes used herein simply refers to conductive pathways, and are not intended to be limited to structures that are strictly linear. Rather, the terms "lines" and "electrodes" may encompass conductive pathways that change direction or that have different size, shape, materials, or regions. The touch sense electrodes 102 may be sensed along conductive lines 100 by a touch sense interface 106 while different rows of touch drive electrodes 104 are driven with touch drive signals along the conductive lines 98 from a touch driver interface 108.

The touch sense electrodes 102 may respond differently to the touch drive signals based on a proximity of an object, such as a finger, to the touch sense electrodes 102. In this way, the presence of the object may be "seen" in a touch sense region 56 that may result at an intersection of the touch drive electrode 104 and the touch sense electrode 102. That is, the touch drive electrodes 104 and the touch sense electrodes 102 may form capacitive sensing nodes, or more aptly, the touch sense regions 56. The touch sense electrodes 102 and touch drive electrodes 104 may gather touch sense information when operating in what may be referred to herein as a touch mode of operation.

Though the touch sense electrodes 102 and touch drive electrodes 104 may be supplied the same or substantially similar direct current (DC) bias voltage, different alternating current (AC) voltages may be supplied and/or received on touch sense electrodes 102 and touch drive electrodes 104 at substantially different times in some embodiments. For example, as previously noted, the electronic display 12 may switch between two modes of operation: a display mode of operation and the touch mode of operation. Furthermore, in some touch sensor arrays 52, an AC reference voltage is used as a ground for the touch sensing operations associated with the touch sensor array 52.

Figure 8:
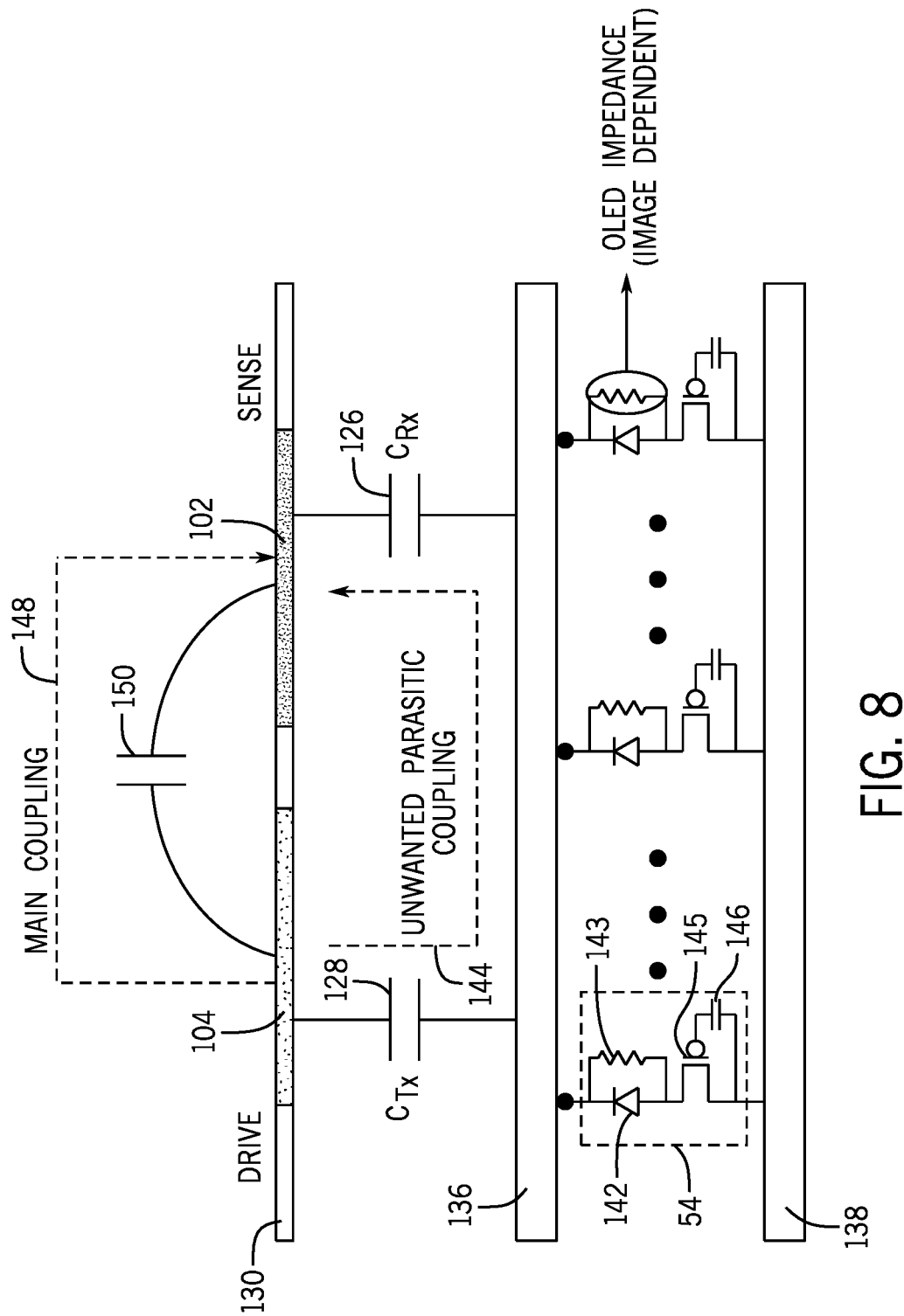
FIG. 8 is a diagrammatic representation of a portion of an electronic display of FIG. 1, in accordance with an embodiment.

As noted above, challenges arise when combining the display pixel array 50 and the touch sensor array 52. To elaborate, FIG. 8 is a diagrammatic representation of a portion of an electronic display 12. A touch layer 130 may include a touch drive electrode 104 and a touch sense electrode 102 in the same spatial plane. Separate drive and sense electrodes (e.g., touch drive electrode 104 and touch sense electrode 102) are used in some touch sensors to measure the main coupling between the two electrodes. In other systems, a same electrode is used for drive and sense in a two-phase capacitive sensing operation having a precharge phase and a charge sampling phase.

A cathode layer 136 may be disposed between the touch layer 130 and a display high voltage supply (ELVDD) layer 138. The cathode layer 136 may couple to the ELVDD layer 138 via display pixels 54. In this example, the display pixels 54 include OLED devices 142, however the display pixels 54 may include any suitable light-emitting device or self-emission component.

Each display pixel 54 may have an impedance 143. The value of the impedance 143 may be image-dependent and may change based on the image data that is currently displayed on the display pixels 54. Previous image data may also affect the value of the impedance 143 (e.g., a hysteresis effect). The impedance 143 may affect values captured via a touch scan of the touch sensor array 52.

Each display pixel 54 may include a capacitor 146 coupled to a gate of a transistor 145. The transistor 145 may be considered a current source. The capacitor 146 may store image data for the display pixel 54. Other circuitry may be included as memory in the pixel, such as one or more back-to-back coupled inverter pairs that form a memory capable of storing multiple bits of image data.

Parasitic capacitances (e.g., parasitic coupling paths 144) may form between the touch layer 130 and the cathode layer 136. The cathode layer 136 may be coupled via undesired parasitic capacitances to the touch drive electrode 104 and the touch sense electrode 102. The parasitic coupling paths 144 may cause sensed capacitance values to change in relation to the noise. For Impedance DTX, parasitic coupling through the cathode layer 136 between the touch drive electrode 104 and the touch sense electrode 102 may change the sensed capacitances, due to changes in settling behavior as at least described in FIG. 9.

As another example, a parasitic capacitance may be formed between touch sense electrode 102 and the display cathode (e.g., cathode layer 136), and the display cathode sees an impedance to AC ground that may be modulated by the displayed image. This modulation may change a sensed value of the parasitic capacitance. The overall signal seen by the touch sensor may be the sum of the parasitic capacitance (with image-dependent error) and the touch capacitance, which may cause inaccurate tactile sensing.

To elaborate, there may be two signal coupling paths—a main path 148 and the parasitic coupling path 144. The main path 148 signal may transmit from the touch drive electrode 104 and may be coupled to the touch sense electrode 102 via a capacitance 150 being sensed. The parasitic coupling path 144 signal may be transmitted from the touch drive electrode 104 and may couple to the touch sense electrode 102 via the parasitic capacitances 126 and 128. Thus, both the baseline and unwanted signals have a same origin and destination—the difference between the two being the path taken from the touch drive electrode 104 to the touch sense electrode 102. The value of parasitic capacitance 126 and/or parasitic capacitance 128 may change with image data presented via the display 12 (e.g., be image-dependent). Touch sensing operations may be affected by one or both of the parasitic capacitances described above, a value of which may correspond to Impedance DTX. Thus, compensating for Impedance DTX based on the values of image data may improve the performance of tactile sensing operations in the electronic display 12.

Figure 9:
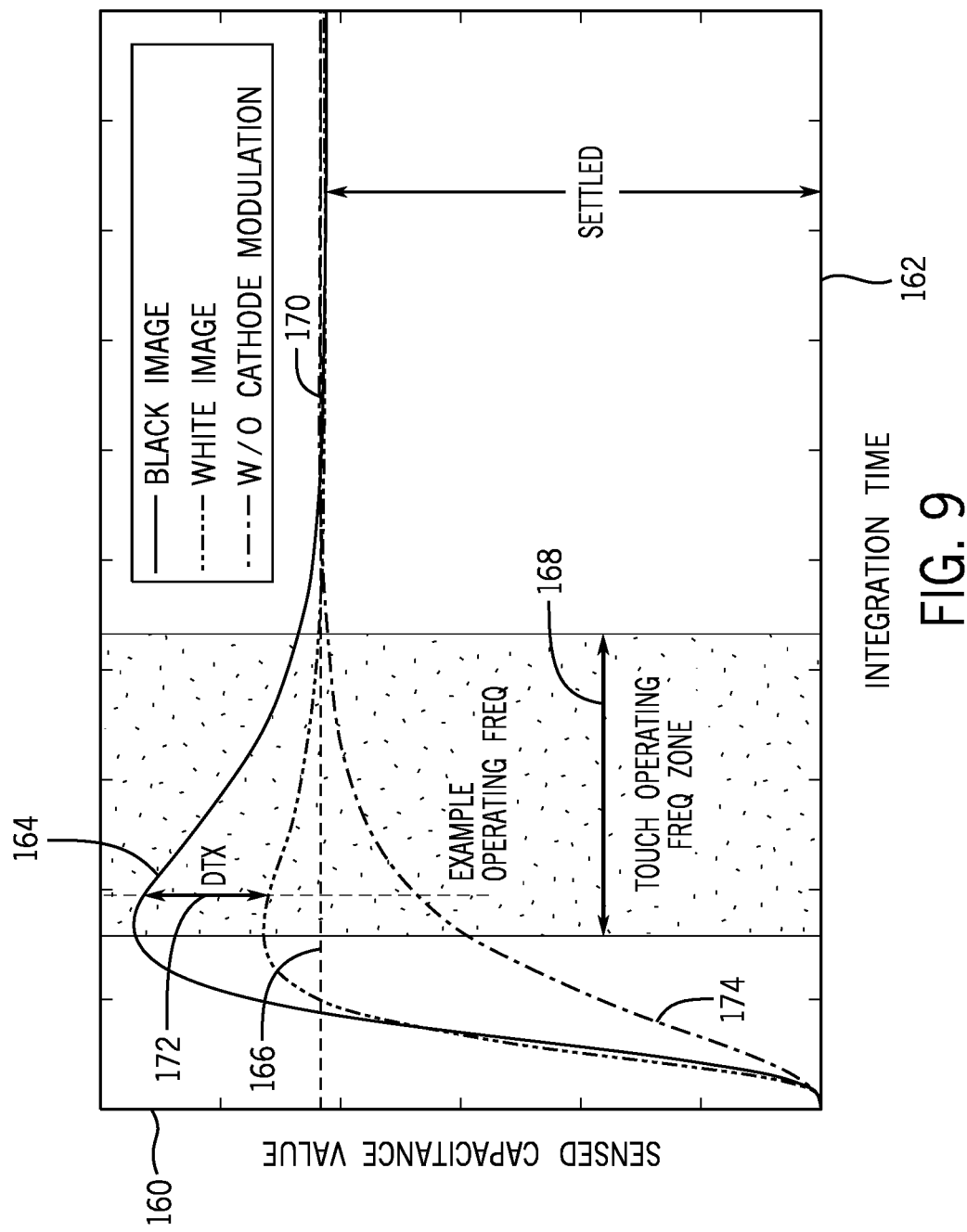
FIG. 9 is a plot comparing capacitances sensed during an image presentation, in accordance with an embodiment.

A particular example appears in FIG. 9, which shows a plot of capacitances sensed by a touch subsystem while different images are presented by a display subsystem. The plot compares sensed capacitance values (axis 160) to integration time (axis 162). Curve 164 corresponds to data simulating presentation of a 100% black image, curve 166 corresponds to data simulating presentation of a 100% white image, and curve 174 corresponds to data simulating sensed capacitance value over time without cathode modulation (e.g., baseline capacitance values). Over time and after integration time period 168, which corresponds to times during which the capacitance may be sensed by the touch subsystem, capacitance values settle to level 170. Integration time (axis 162) may span microseconds, such as between 0 microseconds and 5 microseconds, between 0 microseconds and 10 microseconds, or the like. Sensed capacitance values may span between 0 femtofarads to 1200 femtofarads, between 0 femtofarads to 1400 femtofarads, or the like.

Before settling, the capacitance values overshoot and the amount of overshoot is image dependent. The amount of overshoot also may limit a maximum touch operating frequency that can be used. When touch sensing operations are performed before the capacitance value settles, capacitances sensed during the touch sensing operations may be affected by the Impedance DTX. The Impedance DTX may be represented by a difference 172 in capacitance sensed when sending the low gray level image (e.g., 100% black image data) and in capacitance sensed when sending the high gray level image (e.g., 100% white image data). Thus, compensating the sensed capacitance to account for the parasitic capacitance based on the values of image data may mitigate the Impedance DTX.

Figure 10:
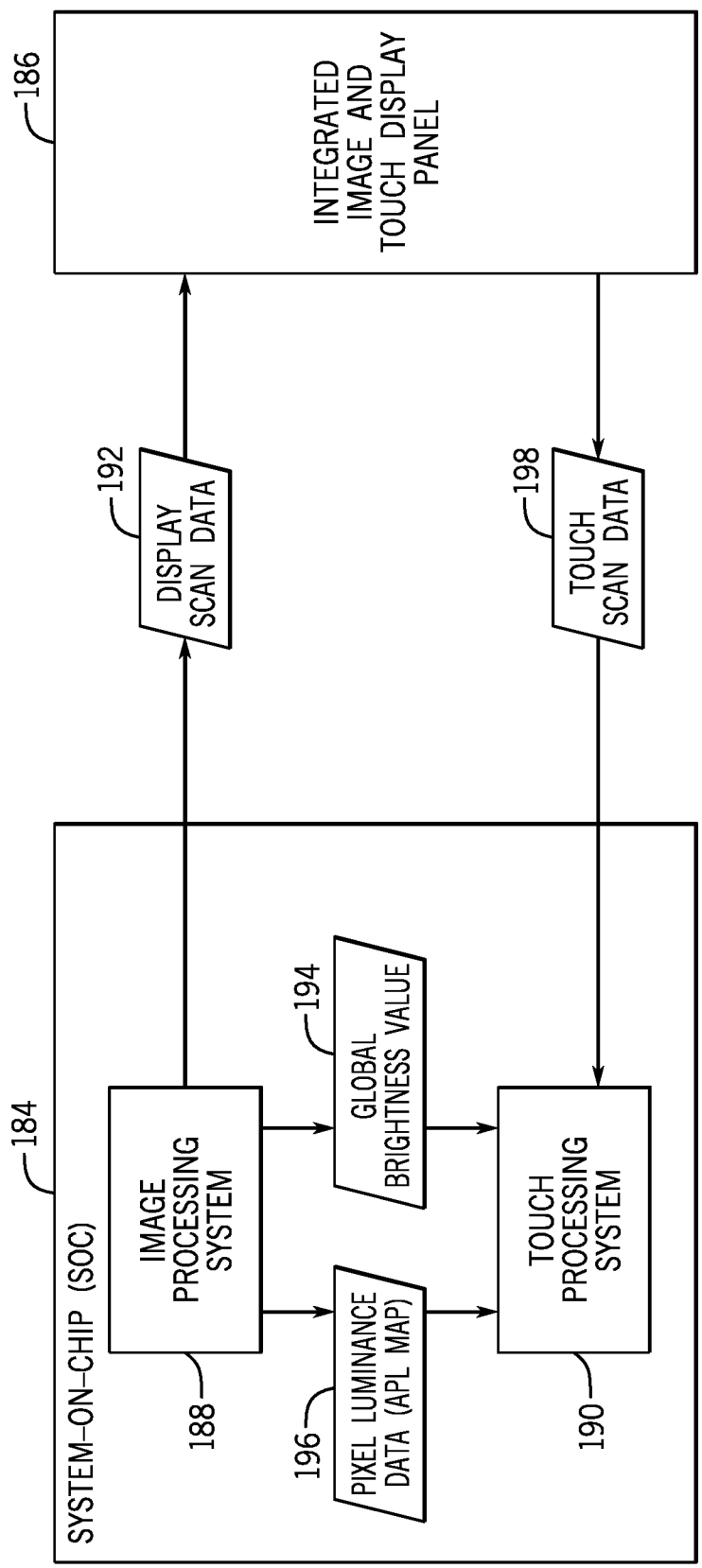
FIG. 10 is a block diagram of a portion of the electronic device of FIG. 1 including a touch processing system, in accordance with an embodiment.

To do so, an electronic device 10 may determine (e.g., estimate) the amount of Impedance DTX and use the amount to remove the capacitance error from the touch scan data. To elaborate, FIG. 10 is a block diagram of an electronic device 10. The electronic device 10 includes a system-on-a-chip (SOC) 184 and an integrated image and touch display 186. The SOC 184 may include an image processing system 188 and a touch processing system 190. The image processing system 188 may receive image data and generate display scan data 192 based on image processing operations and a global brightness value 194.

The global brightness value 194 may refer to an input received via manual or automated controls to brighten or dim the electronic display 12 perceived brightness at a global or display-panel wide adjustment level. The global brightness value 194 may be associated with a defined gray level to luminosity relationship to associate a numerical gray level to a resulting light intensity emitted from the electronic display 12. For example, the global brightness value 194 may reduce a luminosity of a 255 gray level such that a pixel driven with image data indicating a 255 gray level actually emits at a 50% of maximum intensity. Indeed, the global brightness value 194 may trigger a image frame-wide brightness adjustment for a brightness permitted at a maximum gray level value.

The display scan data 192 may include (e.g., be generated based on) indications of APL map 196, such as indications of gray levels at which to operate one or more of the display pixels 54 of the integrated image and touch display 186 transmitted as part of an average pixel luminance map (APL map). The integrated image and touch display 186 may incorporate the touch sensor array 52 from FIG. 7 and the display pixel array 50 from FIG. 6 into a single substrate device, a single system on a chip, an integrated package die, or other suitable integrated panel structure. In some systems, the image processing system 188 may use one or more display pipelines, image processing operations, or the like, when processing the image data to generate the display scan data 192. The image processing system 188 may transmit the APL map 196 and the global brightness value 194 to the touch processing system 190.

The integrated image and touch display 186 may use the display scan data 192 when generating control signals to cause the display pixels 54 to emit light. It may be desired for touch sensing operations to occur substantially simultaneous or perceivably simultaneously to the presentation of the image frames via the integrated image and touch display 186. The touch sensing operations may generate touch scan data 198, which the integrated image and touch display 186 may transmit to the touch processing system 190. To compensate for Impedance DTX, the touch processing system 190 may use the APL map 196 and the global brightness value 194 to determine an amount of sensed capacitance contributed from the Impedance DTX (e.g., to estimate the amount, to calculate the amount). The touch processing system 190 may then adjust the touch scan data 198 based on the determined amount of capacitance contributed from the Impedance DTX to compensate for the Impedance DTX.

In some systems, the APL map 196 may be averaged. Furthermore, the display scan data 192 and/or the touch scan data 198 may be handled on a row-by-row basis of a pixel map, such as a two-dimensional (2D) map (e.g., a vector of a computational matrix).

Figure 11:
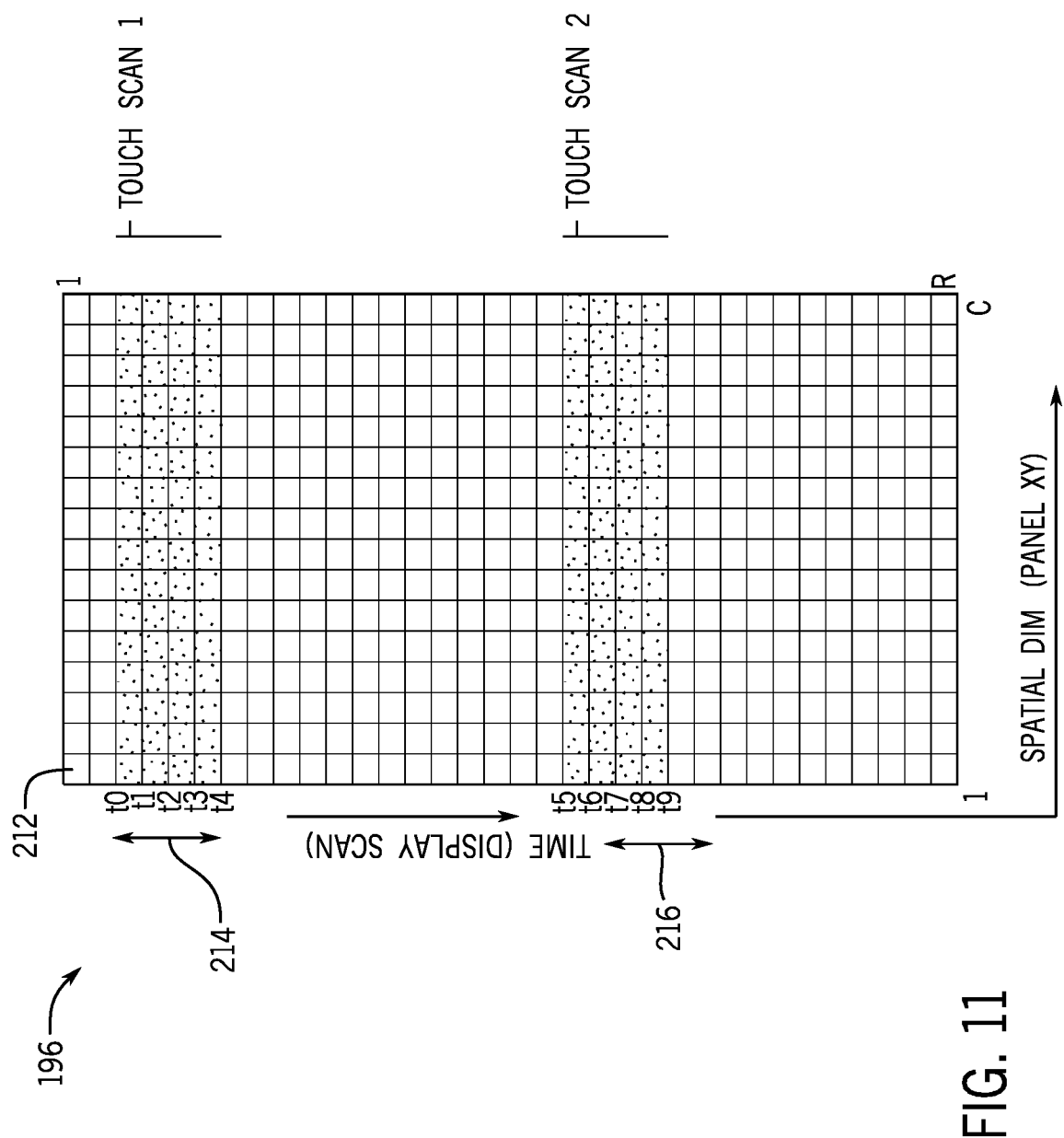
FIG. 11 is a diagrammatic representation of a pixel map processed by the touch processing system of FIG. 10, in accordance with an embodiment.

To elaborate, FIG. 11 is a diagrammatic representation of the pixel luminance data map (APL map) 196, which may describe the average pixel luminance of different regions of the electronic display 12, shown as cells 212. Compensation and touch scan operations described herein may occur during a blanking period between image frames (e.g., further illustrated in FIG. 21), thus image frame data may be static during a touch scan so blending of image data may not occur across frames.

An image frame may be divided into the various cells 212. Image data processed by the image processing system 188 may be converted into grey level values, which may be used to determine a metric of luminance. The image processing system 188 may calculate luminance data, or may use another type of data similarly indicative of current in display pixels 54, and the touch processing system 190 may use the calculated data to predict impedances expected to affect touch scan data while the image frame is presented.

Since a display pixel 54 may emit a more intense light when driven with larger current signals, current signals may relate to luminance values emitted from the display. Values of the current signals may be determined from a function that relates the global brightness value 194, the image data for a respective display pixel 54, and any other suitable data to a current signal to use to drive the display pixel 54 to emit light at the desired gray level. This function may include constants specifically selected for the display pixel 54, and thus may be considered a per-pixel function. When the values of the current signals are averaged, the resulting value may indicate an average luminance of light to be emitted by the display pixels 54 associated with a cell 212. The averaged current values may indicate a contribution from the image frame presentation to errors (e.g., Impedance DTX) affecting a touch sensing operation.

Another way that the image processing system 188 may predict the parasitic capacitance may be to determine the average pixel luminance values (APL data) of the APL map 196 based on the image data. Taking the average pixel luminance values, the touch processing system 190 may use the APL map 196 and the global brightness value 194 to determine an expected amount of Impedance DTX corresponding to respective pixel luminances. Impedance DTX may be a function of pixel currents and the pixel currents may be a function of the pixel luminances, thus direct determination of current values may be bypassed. In some cases, a lookup table may index APL data and display brightness values to an amount of correction to apply to touch scan data to compensate for the Impedance DTX.

The cells 212 may form an iso-grid, two-dimensional matrix of values corresponding to display locations on the integrated image and touch display 186, and it should be understood that different dimensions may be used for different cells 212 in some cases. The APL map 196 may be updated and/or transmitted to the touch processing system 190 line-by-line, cell-by-cell, pixel-by-pixel, or using any transmission pattern based on the display scan data 192. Shown with the APL map 196 are indications of when touch sensing operations occur relative to the cells 212. One or cells 212 may correspond to a different touch sensing region 56. The touch sensing operations, a touch scan, may be performed at times t0-t4 (e.g., range 214) and again at times t5-t9 (e.g., range 216) or any suitable scanning pattern. To save power, if desired, compensation operations may not be performed between the t4-t5 times when a touch scan is not performed. The touch processing system 190 may use the APL map 196 to compensate for Impedance DTX based on the operations of FIGS. 12 and 13.

Figure 12:
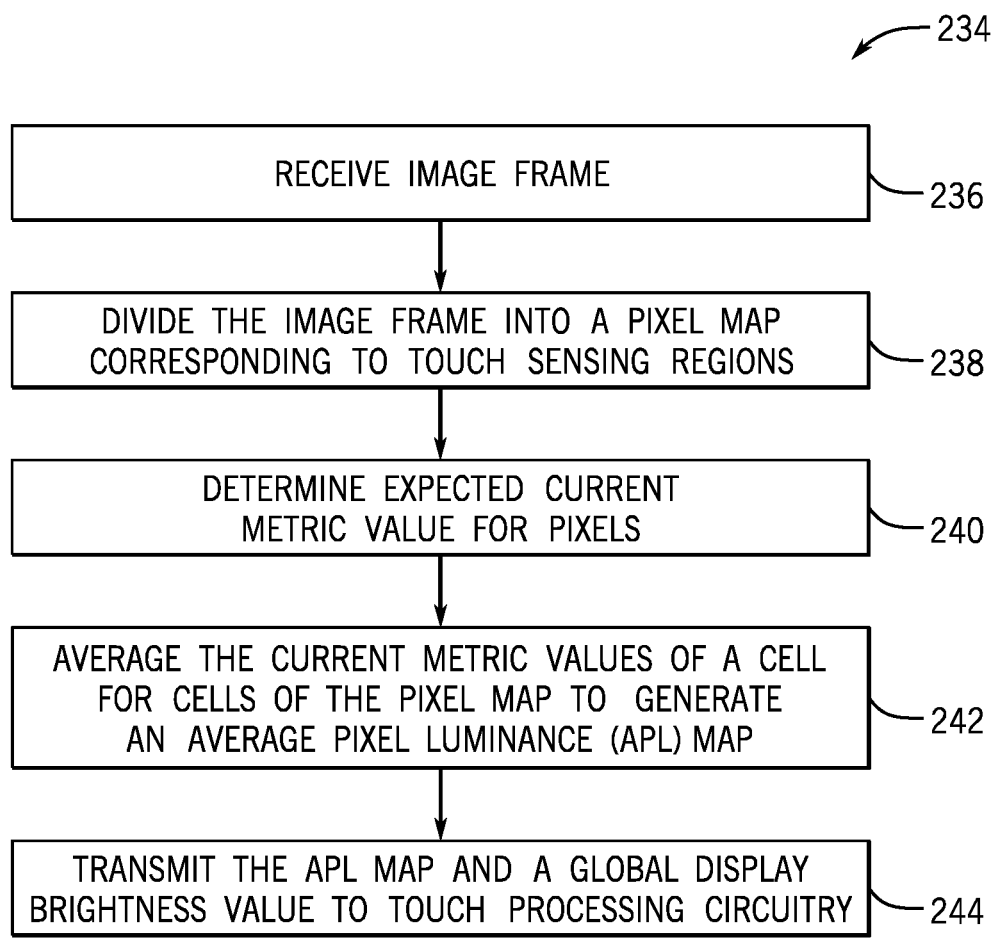
FIG. 12 is a flowchart of a process for operating image processing circuitry to generate data used by the touch processing system of FIG. 10 to compensate for Impedance DTX, in accordance with an embodiment.

FIG. 12 is a flowchart 234 illustrating a process for generating data used by the touch processing system 190 for compensating for Impedance DTX. Although certain operations of the flowchart 234 are presented in a particular order in FIG. 12, it should be understood that additional or fewer operations may be used in a same or different operational order than that presented below. Furthermore, although described herein as performed by the image processing system 188, it should be understood that other circuitry may perform some or all of the operations described herein.

At block 236, the image processing system 188 may receive an image frame generated by any suitable image frame or image data generation process. The image processing system 188 may generate the image frame based on indications of user inputs, programmed operations, or the like. Sometimes, the image processing system 188 may retrieve the image frames from memory. For example, image frames may have been previously generated by an image source and stored in memory for access by the image processing system 188.

At block 238, the image processing system 188 may divide the image frame into cells 212. The cells 212 may correspond to touch sensing regions 56 of the integrated image and touch display 186. There may be the same or a different number of cells than a 1:1 association to the touch sensing regions 56.

At block 240, the image processing system 188 may determine an expected current metric value for the display pixels 54. A suitable current metric value may be any value associated with operation of the display pixel 54 that may be corresponded to a current of the display pixel 54, including voltages over different portions of the display pixel 54, driving signals transmitted to the display pixels 54 and corresponding to image data, gray level values used to generate the driving signals for the display pixels 54, or the like. The image processing system 188 may process the image data corresponding to the display pixels 54 to determine the expected current metric values. In this example, the image processing system 188 uses luminance value, or gray level, as a proxy value for a current associated with the display pixel 54.

At block 242, the image processing system 188 may average the current metric values associated with a cell 212 for the cells 212 to generate the average pixel luminance (APL) map 196. Current metric values may indicate what pixel currents are expected to be while presenting the image data at the global brightness value 194. The global brightness value 194 may be a display brightness value (DBV) representative of a luminance adjustment applied to image data of the image frame as a whole. The DBV may be received based on user input to select between ranges of display brightness values. For example, for image data equal to 255, at a DBV=0% a current drawn may be almost zero but at a DBV=50% may be greater than zero. A current metric value may indicate a pixel luminance value, which may be averaged over the cells 212 to generate the APL map 196. The pixel luminance value may be considered a per-component value and/or a weighted average value. The pixel luminance value may be based on all color components of a respective data value presented via various sub-pixels of a display pixel 54. That calculation may be repeated to generate the APL map 196, such as for each cell 212 of the cells 212. A lookup table may associate image data values and the global brightness value 194 to current metric values. Interpolation between values in the lookup table may obtain current metric values for image data not included in the lookup table. The averaged gray level values, or other suitable average or non-average current metric values, may be transmitted as the APL map 196 to the touch processing system 190.

Thus, at block 244, the image processing system 188 may transmit the APL map 196 and a global brightness value 194 to the touch processing system 190. When transmitting the APL map, the image processing system 188 may transmit the APL map 196 line-by-line, cell-by-cell, pixel-by-pixel, or using any transmission pattern to the touch processing system 190 to transition incrementally between an old image frame and a new image frame. The image processing system 188 may also transmit the display scan data 192 to the integrated image and touch display 186 in a similar line-by-line, cell-by-cell, pixel-by-pixel, or transmission pattern. In some cases, the image processing system 188 also transmits timing information to the integrated image and touch display 186, which may permit the touch processing system 190 to synchronize its processing of touch scan data 198 to the image presented.

As may be appreciated, at block 244, the image processing system 188 may transmit the APL map 196 and the global brightness value 194 to a memory. The memory may be a buffer memory. The memory may be accessible by both the image processing system 188 and the touch processing system 190 and thus may be used to transmit data between the image processing system 188 and the touch processing system 190. These structures are elaborated further on in FIG. 19. The memory may be external to both the image processing system 188 and the touch processing system 190. In some cases, the memory may be disposed in the touch processing system 190 and/or share a chip with the touch processing system 190.

Figure 13:
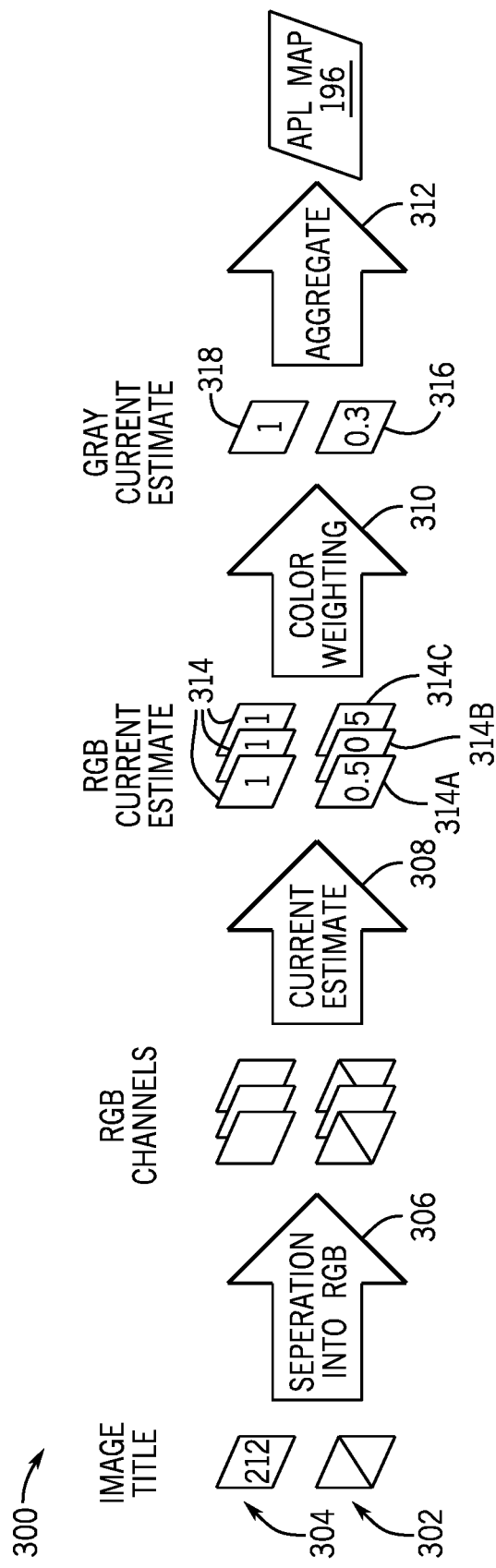
FIG. 13 is a diagrammatic representation of an example method to determine an expected current metric value as part of the process of FIG. 12, in accordance with an embodiment.

Referring back to operations of at least block 242, FIG. 13 is a diagrammatic representation 300 of an example method to determine an expected current metric value as part of the process of FIG. 12. As described with FIG. 11, a respective cell 212 may correspond to one or more display pixels 54. For the image data associated with the display pixels 54 of that cell 212, first example data 302 (e.g., first example image data) may be compared to second example data 304 (e.g., second example image data).

It is noted that the color channel weights may be configurable and may be related to different efficiencies in display pixels of different colors. The two rows of FIG. 13 may represent examples of two different example images (e.g., example image frames) and resulting image statistics.

The second example data 304 may be any suitable data set. For example, the second example data 304 may include white image data (e.g., all 1s, image data corresponding to maximum data values), black image data (e.g., all 0s, image data corresponding to minimum data values), or other suitable testing image datasets.

The image processing system 188 may perform separation into RGB operations 306, where RGB is an example of color channels. Indeed, the image processing system 188 may divide the first example data 302 and the second example data 304, respectively, into cells 212 based on a dimension parameter that specifies a number of pixels to be grouped into respective cells 212, as described above. After one or more cells 212 are generated, each cell 212 of first example data 302 and of the second example data 304 may be separated into its respective color channels. In this example, red-green-blue are used as the color channels. It should be understood that any suitable color channels may be used, such as magenta-cyan-yellow, hue-saturation-lightness, or other suitable divisions may be used. Indeed, the separation of the first example data 302 and/or second example data 304 into the respective color channels may occur at least partially in parallel with generating one or more cells 212.

After separating the image data into color channels 314, the image processing system 188 may perform current estimate operations 308 based on the first example data 302 and second example data 304 being divided into color channels 314. When the second example data 304 corresponds to white data, the estimated current may be a maximum expected current value, which may correspond to 100% of the maximum expected current (e.g., 1*) for each of the color channels 314. When the second example data 304 corresponds to black data, the estimated current may be a maximum expected current value, which may correspond to 0% of the maximum expected current (e.g., 0) for each of the color channels 314. If the first example data 302 corresponds to non-white data or non-black data, the values of image data for each of the color channels may be different with respect to each other. For example, a first color channel 314A may correspond to an expected current of 50% of the maximum expected current (e.g., 0.5*maximum current value), a second color channel 314B may correspond to an expected current of 0% of the maximum expected current (e.g., 0*maximum current value), and a third color channel 314C may correspond to an expected current of 50% of the maximum expected current (e.g., 0.5*maximum current value).

Based on the per-channel expected current, the image processing system 188 may perform color weighting operations 310. The image processing system 188 may process the respective expected currents per color channel 314 of the first example data 302 to determine a weighted current estimate 316 (e.g., grey scale weighted current values), which corresponds to a grey scale current estimate. The weighted current estimate 316 equals in this example approximately 30% of the maximum expected current (e.g., rounded down from 33.33%). The weighted current estimate 318 corresponding to the second example data 304 may equal 100% when the second example data 304 is white data, may equal 0% of the maximum expected current when the second example data 304 is black data, or may equal a different percentage of the maximum expected current when the second example data 304 corresponds to a pattern or a mid-range image data value. Furthermore, if second example data 304 is unchanged between image frames, the weighted current estimate 318 may not be recalculated. Although averaging is described herein, it should be understood that the image processing system 188 may perform any suitable operation to determine the weighted current estimates 316, 318.

After determining the weighted current estimates 316, 318, the image processing system 188 may aggregate the weighted current estimates 316 of the various cells 212 corresponding to the first example data 302 to generate an APL map 196. The APL map 196 may include indications of expected current estimates for each cell 212 of the actual image dataset relative to a maximum expected current. The APL map 196 may include of the weighted current estimate 316, weighted current estimate 318, the second example data 304, and/or the first example data 302.

Figure 14:
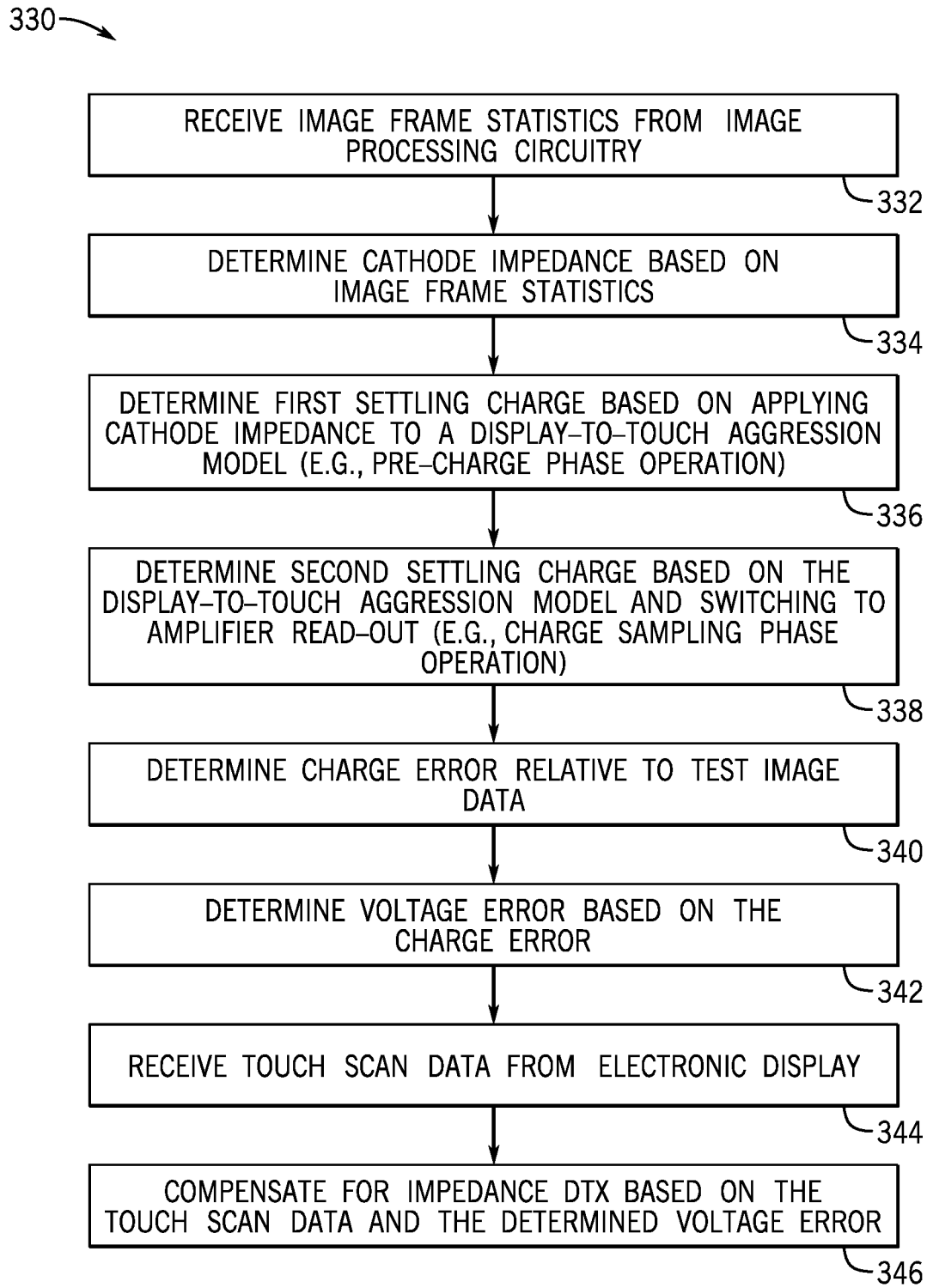
FIG. 14 is a flowchart of a process for operating touch processing circuitry of FIG. 10 to estimate an amount of Impedance DTX based on a multi-phase sensing operation and a display-to-touch aggression model, where the estimated amount of Impedance DTX may be used when compensating touch scan data, in accordance with an embodiment.

After receiving the APL map 196, the touch processing system 190 may estimate a cathode current and impedance to use to compensate for Impedance DTX. FIG. 14 is a flowchart 330 illustrating a process for estimating cathode currents to compensate for Impedance DTX based on the APL map 196 by modeling and/or using a multi-phase touch sensing operation. Although certain operations of the flowchart 330 are presented in a particular order in FIG. 14, it should be understood that additional or fewer operations may be used in a same or different operational order than that presented below. Furthermore, although described herein as performed by the touch processing system 190, it should be understood that other circuitry may perform some or all of the operations described herein.

At block 332, the touch processing system 190 may receive frame statistics from the image processing system 188. In some systems, the touch processing system 190 may receive one or more rows of the APL map 196 and the global brightness value 194 of the image processing system 188.

At block 334, the touch processing system 190 may determine a cathode impedance associated with the cells 212 based on the frame statistics, which may include one or more rows of the APL map 196. A value of the cathode impedance may correspond to a non-image dependent component (e.g., value component, portion of the value) and an image dependent component. The non-image dependent (e.g., image independent) component may correspond to the physical panel properties and other components connected to the LED cathode (e.g., cathode layer 136). The image dependent component may correspond to an impedance of the OLEDs 142 or LEDs (e.g., light-emitting components) themselves (e.g., of the pixels 54) or other changing small signal parameters. The overall cathode impedance function may also be calibrated on a per-unit basis, either through direct measurement of physical components that the parameters represent, or through indirect inference from other electrical measurements. In some systems, the touch processing system 190 may determine the cathode impedance based on the APL map 196 snapshots and the global brightness value 194. To do so, the touch processing system 190 may apply APL values of one or more of the cells 212 and the global brightness value 194 to a function to determine a respective cathode impedance or a contribution to the overall cathode impedance. The function may be generated based on a training algorithm that uses training sets of images to estimate Impedance DTX. A physics model may be used to generate the function to determine Impedance DTX resulting from test image data. After the physics model is generated, the model may be parameterized to determine variables and a function to later be applied based on or using the APL values of one or more of the cells 212 and the global brightness value 194. In some cases, a look up table may relate the APL values of one or more of the cells 212 and/or the global brightness value 194 to an expected cathode impedance. In some cases, a deep neural network, a connected neural network, machine learning-techniques, or the like may be used to generate the function for determining the cathode impedance.

Figure 15:
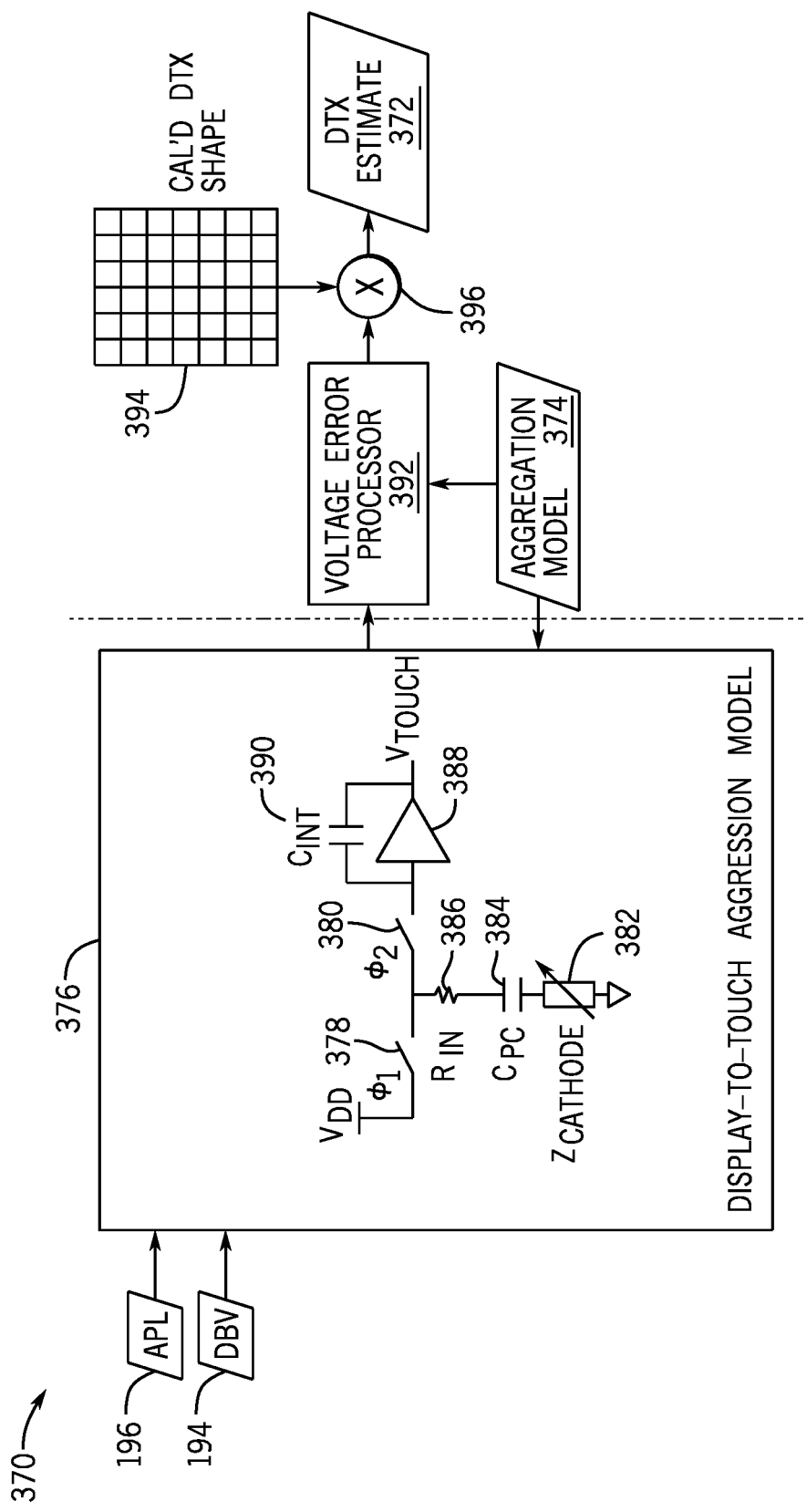
FIG. 15 is a diagrammatic representation of a process for estimating the amount of Impedance DTX based on an aggregation model and a display-to-touch aggression model, in accordance with an embodiment.

Indeed, one example function may correspond to the display-to-touch aggression model described in reference to FIG. 15, which may use the determined cathode impedance and determine a voltage error that compensates some amount of Impedance DTX. Indeed, to use the display-to-touch aggression model 376, the touch processing system 190 may perform operations of blocks 336-342, which will be described further below with reference to FIGS. 15-17. The display-to-touch aggression model 376 may be based on the linear relationship between a current through a light-emitting component (e.g., OLED, LED) and a luminance produced by the light-emitting component. It is noted that the display-to-touch aggression model 376 may be implemented in circuitry and/or modelled through various relationships used by the touch processing system 190 to determine a voltage error based on the APL map 196 and the global brightness value 194. Indeed, the multi-phase sensing operations of FIG. 14 may be performed based on switching open and closed the switches of the display-to-touch aggression model 376 of FIG. 15, which may correspond to a two-phase computational modeling operation. In this way, one or more of the operations of blocks 336-342 may correspond to modeling operations. Since a touch stimulus may negligibly (or not) affect a display pixel bias point, the display-to-touch aggression model 376 may be based or modelled based on an OLED/TFT model that includes a resistor and a capacitor coupled in parallel (to model the OLED operation in response to a touch stimulus) and a node of that parallel connection being coupled in series to another resistor (to model the TFT operation in response to a touch stimulus). One or more parameters of the display-to-touch aggression model 376 may be determined based on material properties of the electronic display 12 and components of the electronic display 12. One or more parameters of the display-to-touch aggression model 376 may be calibrated based on a process in which one or more devices (e.g., sensing devices) may be used to capture display-to-touch aggression characteristics (e.g., through one or more sensed current and/or voltage data) that result from a respective display 12 being driven to emit light at one or more display luminance values (e.g., display brightness values).

To elaborate, at block 336, the touch processing system 190 may determine a first settling charge based on applying the determined cathode impedance to a display-to-touch aggression model 376 (e.g., pre-charge phase operation, $\phi_1$). The pre-charge phase operation may pre-charge a sensing capacitance (Cpc) (e.g., sensing capacitor) formed between the touch sensor electrode and the cathode based on the cathode impedance determined based on the image frame statistics received at block 332. The touch processing system 190 may determine a pre-charge phase settling charge ($Q_1$) based on applying a high reference voltage (VDD) to the display-to-touch aggression model 376, where the high reference voltage (VDD) may equal 1 volts (V), 0.9 V, 1.2 V, a voltage between 0.8 V-1.2 V, or any suitable voltage value. At block 338, the touch processing system 190 may determine a second settling charge based on switching the display-to-touch aggression model 376 (e.g., charge sampling phase operation, $\phi_2$) to model amplifier readout. During the charge sampling phase operation, the touch processing system 190 may update the display-to-touch aggression model to connect the charged sensing capacitance (Cpc) to an amplifier to compute a settling charge ($Q_2$) of the display-to-touch aggression model 376. To update the model, the touch processing system 190 may open a first switch (switch $\phi_1$) and close a second switch (switch (2), as elaborated further on in FIG. 15. In some cases, the amplifier may be used to model an analog front end of which may sense a tactile input (e.g., $V_{touch}$).

At block 340, the touch processing system 190 may determine a charge error between the image data being tested and test data. The charge error may be computed relative to a black image or all zero image data. The touch processing system 190 may compute the charge error by comparing resulting settling charges to the test data. The test data may correspond a black image or all zero image data, or in some cases may correspond to second example data 304. In some cases, the charge error may correspond to a difference between first data and second data (e.g., the actual data) associated with the image frame statistics received at block 332. The difference may correspond to a difference between a first charge and a second charge. The first charge may correspond to a difference between a first settling charge computed at block 336 applied to the second data (e.g., based on the actual data) and a second settling charge computed at block 338 applied to the second data. The second charge may correspond to a difference between a first settling charge computed using similar operations of block 336 applied to test data, and a second settling charge computed using similar operations of block 338 applied to the test data.

At block 342, the touch processing system 190 may determine voltage error based on the charge error. Any suitable relationship may be applied by the touch processing system 190 to determine the voltage error based on the charge error. Indeed, the touch processing system 190 may reference an impedance model that relates a panel or pixel impedance to a voltage error expected when sensing a tactile input.

It is noted that the display-to-touch aggression model 376 of blocks 336, 338, and/or the relationship used to determine the voltage error based on the charge error may be any suitable model in some systems. For example, a relationship may be referenced that associates the frame statistics of block 332 ("APL") to sums of weights of the different color channels ("$W_r$", "$W_g$", "$W_b$") (e.g., configurable color channel weights) being used to scale respective image data ("$im_r$", "$im_g$", "$im_b$") received for each of the color channels. Another relationship may associate OLED conductance ("$g_d$") to APL map 196 ("APL") multiplied by global brightness value 194 ("DBV") and modified by OLED conductance coefficients used to offset and scale the APL map and DBV product, which may be determined during manufacturing as representative of electronic device 10 operations. Another relationship may associate OLED capacitance ("$c_d$") to APL map 196 ("APL") multiplied by global brightness value 194 ("DBV") and modified by OLED capacitance coefficients used to offset and scale the APL map and DBV product, which may be determined during manufacturing as representative of electronic device 10 operations. Another relationship may associate TFT conductance ("$g_t$") to APL map 196 ("APL") multiplied by global brightness value 194 ("DBV") and modified by TFT conductance coefficients used to offset and scale the APL map and DBV product, which may be determined during manufacturing as representative of electronic device 10 operations. Indeed, depending on how many computing resources are desired to be dedicated to the Impedance DTX compensation operation, many parameters (e.g., more than 10 parameters, 17 parameters) may be trained globally per display configuration. Over time, these various parameters and relationships may be retrained to compensate for display degradation over time from exposure to heat and use and/or to compensate for performance variations due to process variations, temperature variations, and/or voltage variations. Indeed, these various parameters may correspond to APL color weight parameters, OLED conductance parameters, OLED capacitance coefficients, TFT conductance coefficients, touch stimulation input conductance, touch pixel-to-cathode capacitance, VDD trace components and/or parasitic, VSS trace components, or the like.

In some systems, it is noted that the display-to-touch aggression model 376 of blocks 336, 338, and/or the relationship used to determine the voltage error based on the charge error may be any suitable model in some systems. For example, a relationship may associate a discrete time approximation to a voltage over the sensing capacitance (Cpc) of block 336 and a value that changes over time (e.g., $$"\frac{d}{dt}")$$

as the sensing capacitance is charged (e.g., "$v_{pc}(t)$"). Another relationship may associate a change in cathode voltage over time to the sensing capacitance being charged and a value that changes over time. Another relationship may associate a change in stimulus voltage over time to the voltage applied to charge the sensing capacitance during operations of block 336 and/or of block 338. The sensing capacitance (Cpc) may be any suitable device that behave similar to charging and discharging of a capacitor. In some cases, the sensing capacitance (Cpc) may instead represent one or more impedances, one or more resistances, and/or one or more capacitances. The relationships described above may correspond to a state transition matrix that may be solved with values obtained during the respective sensing phases, in conjunction with and/or independent of the display-to-touch aggression model 376, to determine an expected voltage error when the corresponding image data is presented and affecting a touch scan.

Once the touch processing system 190 has the voltage error estimated or determined, at block 344, the touch processing system 190 may receive the touch scan data 198 from the integrated image and touch display 186. The touch scan data 198 may include indications of sensing capacitance based on signal interactions between the touch drive electrode 104 and the touch sense electrode 102 of FIG. 8 during a touch scan operation. After receiving the touch scan data 198 and determining the voltage error at block 342, at block 266, the touch processing system 190 may compensate for Impedance DTX based on the touch scan data 198 and the determined voltage error. To compensate, the voltage error may be subtracted from the touch scan data 198 or otherwise used to compensate for the Impedance DTX.

Figure 16:
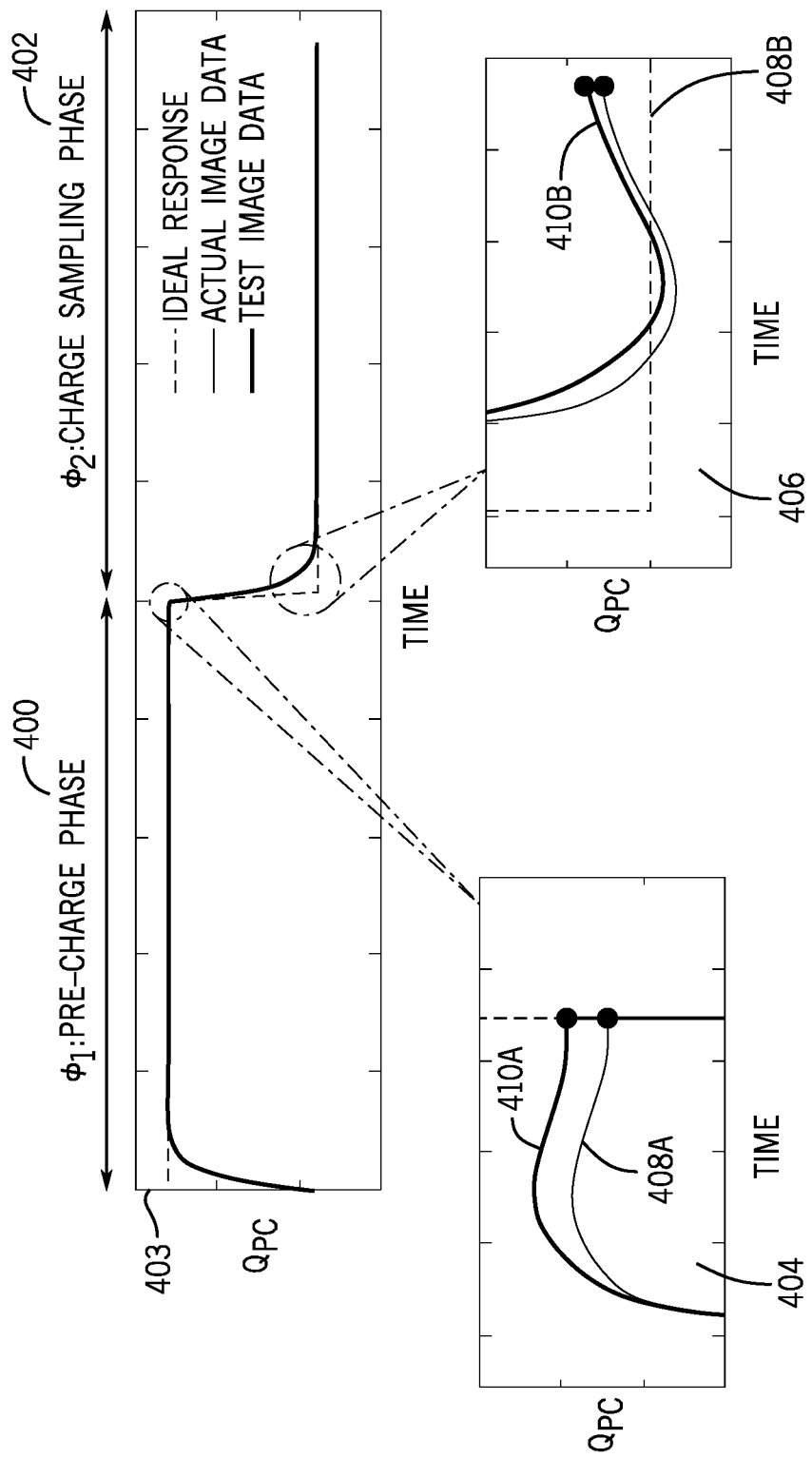
FIG. 16 is a diagrammatic representation of charge errors determined based on the display-to-touch aggression model of FIG. 15 during two respective phases of the multi-phase settling charge operation of FIGS. 14-15, in accordance with an embodiment.
Figure 17:
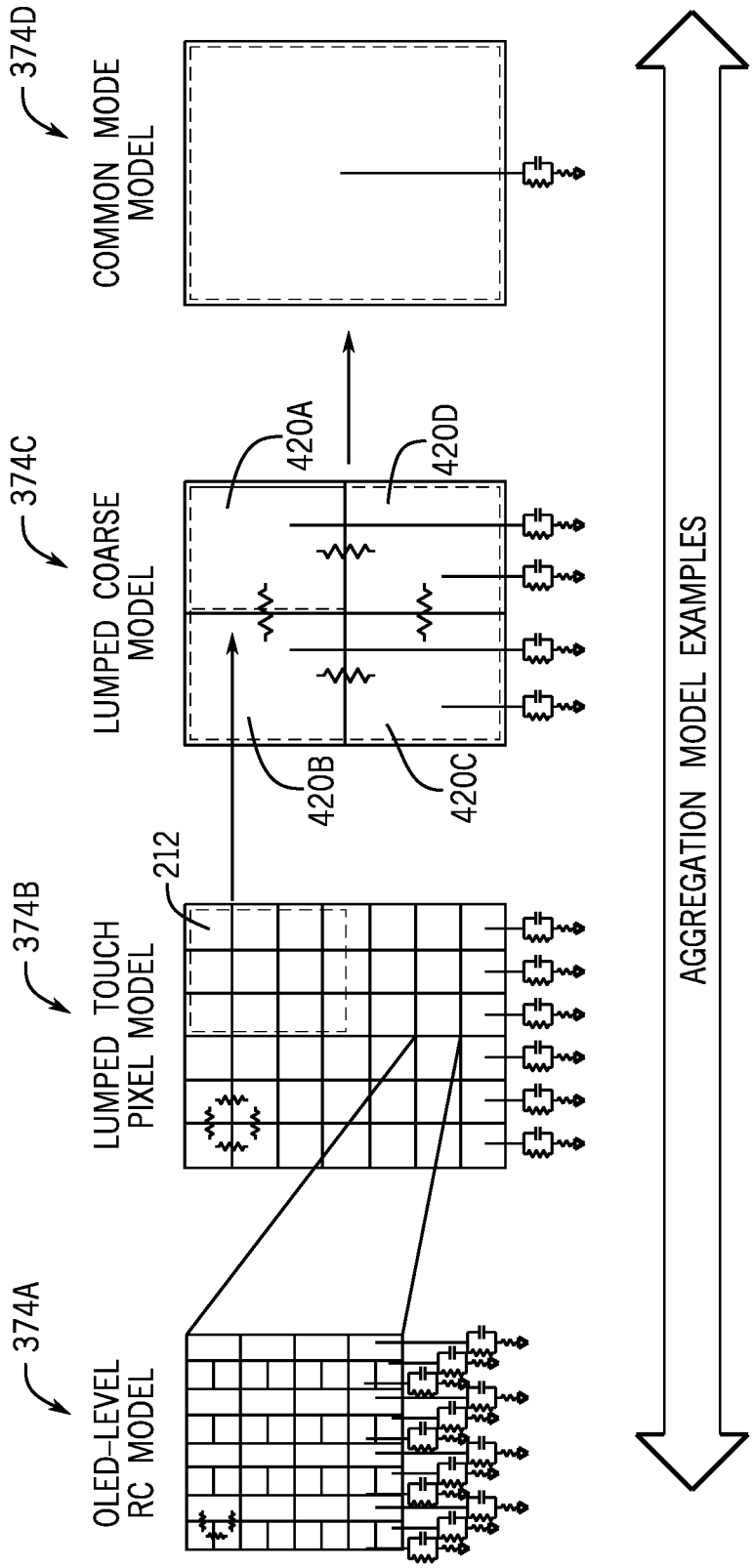
FIG. 17 is a diagrammatic representation of examples of aggregation models that may be applied in FIG. 15 to estimate the amount of Impedance DTX via the display-to-touch aggression model, in accordance with an embodiment.

Elaborating further on operations of blocks 336-342, reference is made herein to FIGS. 15-17 together. FIG. 15 is a diagrammatic representation 370 of a process for estimating the amount of Impedance DTX (e.g., DTX estimate 372 data output) based on an aggregation model 374 and a display-to-touch aggression model 376 using a multi-phase sensing operation. FIG. 16 is a diagrammatic representation of charge errors determined based on the display-to-touch aggression model 376 during two respective phases of the multi-phase settling charge operation described at least in reference to FIGS. 14-15. FIG. 17 is a diagrammatic representation of examples of aggregation models 374 that may be applied in FIG. 15 to generate the DTX estimate 372 via the display-to-touch aggression model 376.

The display-to-touch aggression model 376 may model the OLED/TFT circuit within the display pixels 54 using one or more impedance, resistive, or capacitive devices. Indeed, in one example model, a resistor may be coupled in series to a resistor and capacitor coupled in parallel. By doing so, the touch processing system 190 may process the received image statistics into circuit impedances to be used to determine Impedance DTX by way of determining a settling error over the sensing capacitance. The touch processing system 190 may computationally model the OLED/TFT model. Indeed, physical components coupled together in the display-to-touch aggression model 376 may be represented computationally through equations, variables, program sequences, or the like to enable the touch processing system 190 to generate a DTX estimate 372 based on indications of inputs 194, 196. As described herein, multi-phase sensing operations may correspond to multiple stepped operations of a DTX prediction operation (e.g., $\phi_1$, $\phi_2$) which correspond to hardware touch sensor operations described herein. The touch processing system 190 may model these steps computationally for the determination.

As described herein the touch processing system 190 may generate the DTX estimate 372 data output by applying inputs to the display-to-touch aggression model 376. It should be understood that these processing operations may be performed by the electronic device 10 using a different processing system, such as the image processing system 188, a display controller, or the like.

The touch processing system 190 may receive the APL map 196 and the global brightness value 194 from the image processing system 188. This data may be applied to the display-to-touch aggression model. Indeed, the APL map 196 and the global brightness value 194 may be used to estimate an expected cathode impedance. The expected cathode impedance may correspond to an expected amount of current to transmit when the image data corresponding to the APL map 196 is presented in the future via the display. This may correspond to operations of block 334. Once determined, the touch processing system 190 may apply the expected cathode (e.g., display cathode) impedance as cathode impedance 382 to the display-to-touch aggression model 376.

At block 336, when the first phase sensing operation occurs (e.g., phase 400 in FIG. 16), the touch processing system 190 may close a switch 378 and open a switch 380. By closing the switch 378, the touch processing system 190 may couple the cathode impedance 382 to the reference voltage (VDD) supply rail to charge a sensing capacitance 384 (Cpc). The display-to-touch aggression model 376 may also include a resistance 386 (Rin). The resistance 386 may correspond to expected system resistances. In some cases, the resistance 386 may be varied over time to compensate for system performance changes with process, temperature, and voltage variations.

At block 338, when the second phase sensing operation occurs (e.g., phase 402 in FIG. 16), the touch processing system 190 may open the switch 378 and close the switch 380. By doing so, the touch processing system 190 may couple the sensing capacitance 384 (Cpc) to an output amplifier 388 and integration capacitor 390 (Cin) to model capacitor discharge that would be expected to occur in response to an actual tactile input.

At each sensing stage, the charge error may be computed (e.g., operations of block 340). The charge errors are generally illustrated in FIG. 16. Inset plots 404 and 406 are included to show close-ups of portions of plot 403 to illustrate the differences between the ideal response, the actual image data, and the test image data. Plot 404 in FIG. 16 illustrates the first settling charge determined at block 336 over time and plot 406 in FIG. 16 illustrates the second settling charge determined at block 338 over time. In both plots 404 and 406, the settling charges determined for the test image data are compared relative to the settling charges determined for the actual image data. In both plots 404 and 406, the actual image data (e.g., line 408A and 408B) resulted in lower settling charges than the test image data (e.g., line 410A and 410B).

As part of operations of block 342, The touch processing system 190 may determine a voltage error based on an aggregation model 374. The touch processing system 190 may operate a voltage error processor 392 to receive the various setting charges from the display-to-touch aggression model 376 and/or one or more of the parameters described above with reference to relationships used to determine the voltage error based on the aggregation model 374. The aggregation model 374 may change based on how specific of an estimate the touch processing system 190 is instructed to generate or determines to generate. Indeed, in some cases, the touch processing system 190 may change a granularity of the aggregation model 374 in real time and based on real operating conditions and/or compute demands. This may occur between image frames, APL map 196 datasets received, or as is described relative to FIG. 19, between queued APL statistics of a display state buffer. The aggregation model 374 may be selected from one or more aggregation models stored in memory based on a variety of parameters, including for example a number of computing resources dedicated to compensation and/or an amount of time that may be expended processing the Impedance DTX compensation. This is generally represented by the diagrammatic representation in FIG. 17, where the aggregation model examples are arranged from relatively higher complexity (e.g., more accuracy at the tradeoff of increased computational resources) with "OLED-level RC model" to lower complexity (e.g., reduced accuracy at the tradeoff of decreased computation resource consumption) with "common mode model."

In FIG. 17, the aggregation models may change a level of approximation used to determine the DTX estimate 372, a level of detail by which to receive the image frame statistics at block 332, and/or a level of detail by which to model the impedance network of the integrated image and touch display 186. One example model, a "OLED-Level RC Model" (e.g., aggregation model 374A) may correspond to a model where each display pixel 54 of the integrated image and touch display 186 is represented in an impedance network and/or in the display-to-touch aggression model. Another example model, a "Lumped Touch Pixel Model" (e.g., aggregation model 374B) may correspond to a model where groups of one or more display pixels 54 (e.g., at least one pixel, at least two pixels) of the integrated image and touch display 186 is represented in an impedance network and/or in the display-to-touch aggression model. The display pixels 54 may be grouped based on which set of display pixels 54 corresponds to respective cells 212 (e.g., of the APL map 196), which corresponds to the display pixels 54 associated with the touch sense regions 56.

In yet another example, a "Lumped Coarse Model" (e.g., aggregation model 374C) may correspond to a model where groups of multiple display pixels 54 (e.g., at least one pixel, at least two pixels) of the integrated image and touch display 186 are represented in an impedance network and/or in the display-to-touch aggression model in groupings relatively larger than the aggregation model 374B. The display pixels 54 may be grouped based on which set of display pixels 54 corresponds to respective cells 212 (e.g., of the APL map 196), which correspond to the display pixels 54 associated with the touch sense regions 56. Furthermore, the various cells 212 (e.g., groupings of display pixels 54 and touch sense regions 56) may be further grouped into regions of the active area (e.g., regions 420A, 420B, 420C, 420D).

In yet another example, a "common mode model" (e.g., aggregation model 374D) may correspond to a model where each of the display pixels 54 and the touch sense regions 56 are associated into one region to determine an overall voltage error of the active area. In the aggregation model 374D example, a portion of the active area may be disposed outside the region under consideration with the common mode model, which may be desired in the event that alternative compensations performed to edges of the active area and/or in portions of the active area potentially on a display bend, or the like.

Although shown as equal sizes, it is noted that the regions 420 and/or the cells 212 may be unequal in size, area, or dimension in any of these aggregation models 374. Furthermore, it is noted that the overall active area shape may vary based on display dimensions. Concentrations of pixels and/or touch sense regions 56 associated with each of the regions 420 and/or cells 212 may further vary based on relative temperature, process, or voltage variances. For example, one subset of the active area may be relatively warmer in ambient temperature during normal operation and thus different groupings of display pixels 54 and/or cells 212 (or dimensions) may be applied there to better compensate for the performance variances.

Referring back to FIG. 15, the touch processing system 190 may apply the aggregation model 374, once selected, to the voltage error processor 392. In some cases, the selected aggregation model 374 may be applied to the display-to-touch aggression model 376 to change a level of impedance modeling or other aspect of the circuitry illustrated to correspond to the selected aggregation model 374. Once the voltage error is determined based on the voltage error processor 392, the touch processing system 190 may calibrate the voltage error to a desired matrix 394, such as dimensions of the active area, via a multiplier 396, to generate the DTX estimate 372 data output.

Keeping the foregoing in mind, the display-to-touch aggression model 376 may be additionally combined with synchronization operations to better align processing and compensation operations with potentially repeated image frames and other changes in display operations.

Figure 18:
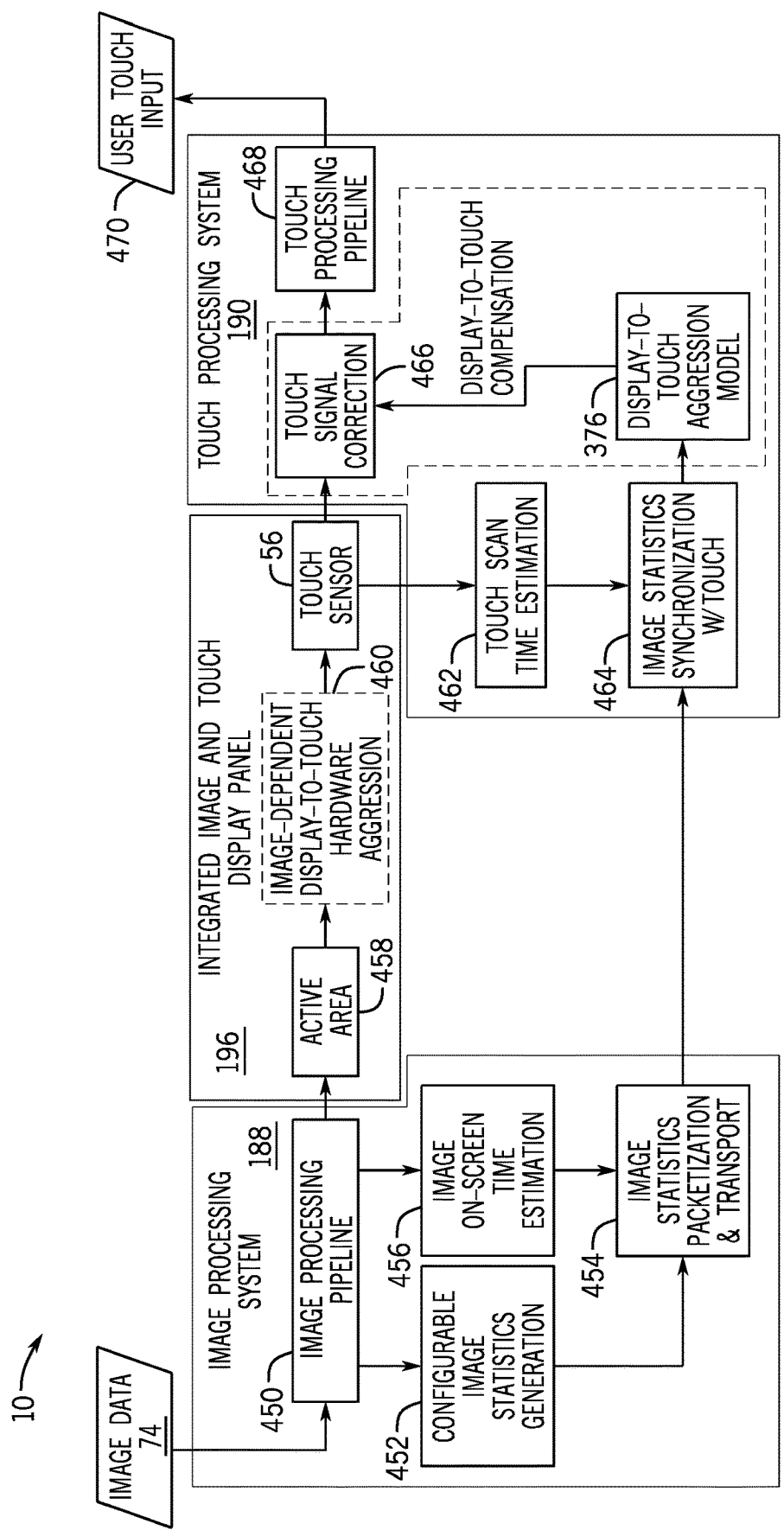
FIG. 18 is a block diagram of the electronic device of FIG. 10 with systems to enable image statistics synchronization with touch data and to enable compensation based on the display-to-touch aggression model corresponding to FIGS. 14-17, in accordance with an embodiment.

To elaborate, FIG. 18 is a block diagram of the electronic device 10 with systems to enable image statistics synchronization with touch data and to enable compensation based on the display-to-touch aggression model 376 corresponding to FIGS. 14-17. The electronic device 10 may include sub-systems previously described and/or the image processing system 188, the integrated image and touch display 186, the touch processing system 190, an image processing pipeline 450, a configurable image statistics generation processor 452, an image statistics packetization and transport processor 454, and an image on-screen time estimation processor 456. The integrated image and touch display 186 may include an active area 458, an image-dependent display-to-touch hardware aggression associated with presentation and tactile input operations (e.g., represented by signal 460), and one or more touch sense regions 56. The touch sense regions 56 may receive a tactile input that has been undesirably influenced by Impedance DTX and thus may be processed based on display-to-touch compensation operations to correct at least some of the Impedance DTX. The touch processing system 190 may operate based on a touch scan time estimate processor 462, an image statistics synchronization with touch processor 646, a touch signal correction processor 466 (that together with the display-to-touch aggression model 376 is associated with display-to-touch compensation operations of FIG. 19), and a touch processing pipeline 468. One or more of these systems together may operate to generate a user touch input 470 that has been corrective of at least some Impedance DTX.

Figure 19:
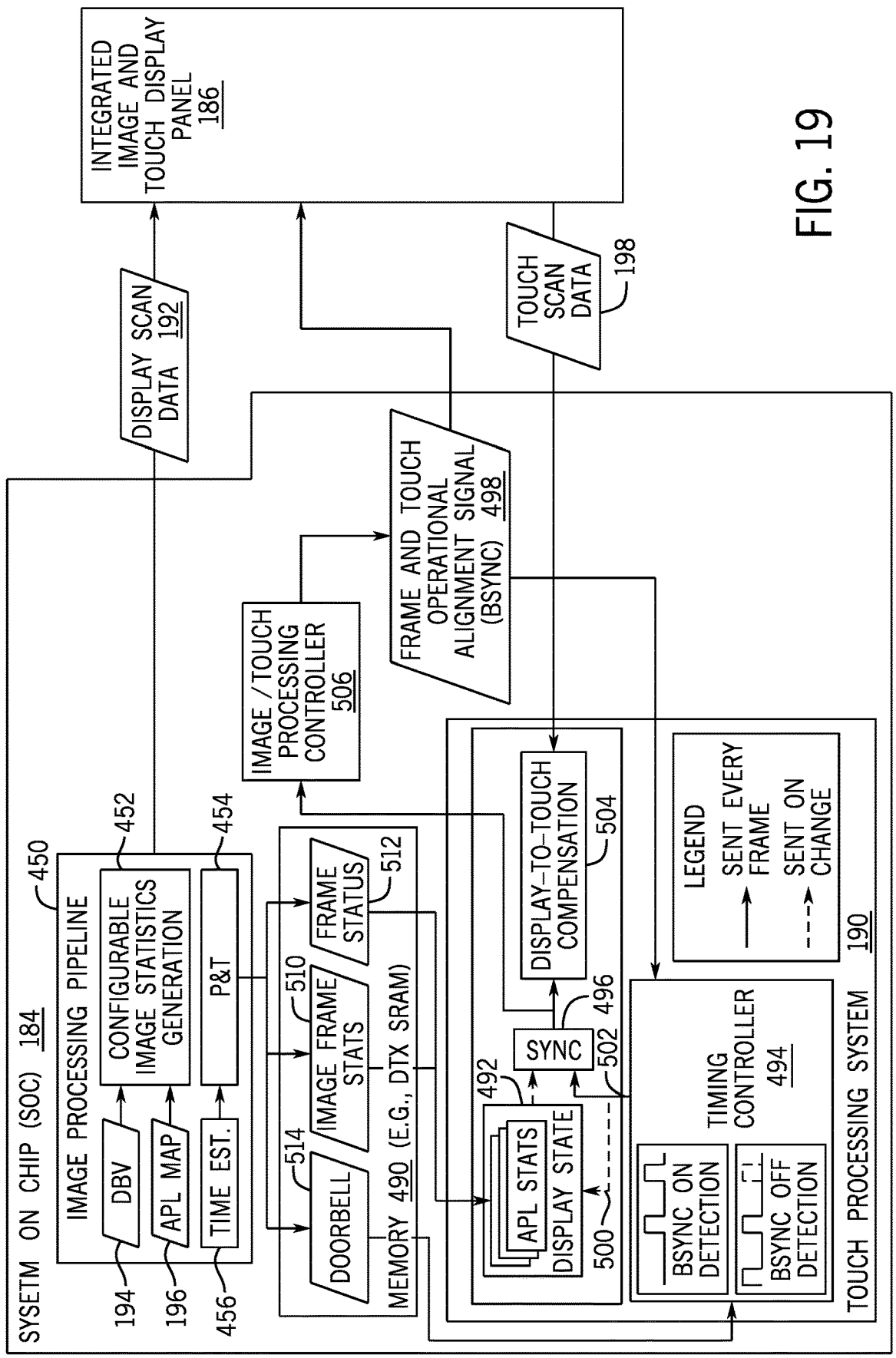
FIG. 19 is a block diagram of the electronic device of FIG. 18 illustrating the image processing circuitry and the touch processing system of FIG. 10 communicating via a memory (e.g., buffer memory), in accordance with an embodiment.

The image processing pipeline 450 may receive image data 74 and process the image data 74 to prepare the image data 74 for presentation via pixels in the active area 458. These processing operations may occur before the image data 74 is transmitted to the data driver circuitry 78 in FIG. 6. The image processing pipeline 450 may perform color correction operations, queuing or scheduling operations, processing based on the global brightness value 194 or the like. Once processed, the image processing pipeline 450 may transmit the image data to the configurable image statistics generation processor 452 to generate image statistics, which may include the APL map 196 and/or the global brightness value 194. In some cases, the image statistics also include display statuses, like "on," "powering on," "off," "sleep," "changing image data," "refresh" or the like. Furthermore, the image statistics may also include data like an on screen timestamp, a memory transfer timestamp, or the like. Once generated, the image statistics may be transmitted to the image statistics packetization and transport processor 454. The image statistics packetization and transport processor 454 may packet the statistics into a packet that includes the on screen timestamp, the scan timestamp, the global brightness value 194, and one or more portions of the APL map 196. The frame statistics that are packetized may correspond to an image frame not yet presented via the active area 458. The on screen timestamp may correspond to a display time of a corresponding image frame. The memory transfer timestamp may correspond to a time at which the packet is to be transmitted to the touch processing system 190 for further use. In some cases, the packet is queued in a buffer memory accessible by the touch processing system 190. FIG. 19 includes an example of this buffer memory.

Referring briefly to FIG. 19, FIG. 19 is a block diagram of the electronic device 10 of FIG. 18 and includes the image processing system 188 and the touch processing system 190 of FIG. 10 being coupled via a memory (e.g., buffer memory). The image processing pipeline 450 in FIG. 19 includes the configurable image statistics generation processor 452 that receives the global brightness value 194 and the APL map 196. The configurable image statistics generation processor 452 outputs data to the image statistics packetization and transport processor 454. The image statistics packetization and transport processor 454 may receive the on screen timestamp data and the memory transfer timestamp data from the image on-screen time estimation processor 456. The image statistics packetization and transport processor 454 may package the statistics into a packet that includes the on screen timestamp, the memory transfer timestamp, the global brightness value 194, and one or more portions of the APL map 196. Once packetized and ready for transfer, the image statistics packetization and transport processor 454 may write one or more packets of associated image frame statistics into memory 490.

Data associated with the DTX compensations operations may be transferred to a memory that is accessible by other systems (e.g., touch processing system 190). For example, the image processing system 188 may write the APL map 196 to a memory and the touch processing system 190 may read the APL map 196 from the memory. The DTX compensations operations may consume large amounts of computing resources and power. To mitigate the large resource consumption, the SOC 184 may control how transactions are made to access and/or write the data associated with the DTX compensations (e.g., image statistics and corresponding timestamps). The image processing system 188 may write the data to an intermediary memory device accessible by other systems, such as the touch processing system 190. The touch processing system 190 may read data from the intermediary memory device (e.g., memory 490) to perform the DTX compensation operations and/or to queue the data for synchronization.

As noted above, the touch processing system 190 may repeat using data from a previous frame to compensate for Impedance DTX. In some cases, the switch from real-time processing to repeated data processing may be based on whether timing of the compensation operations are meeting timing specifications. When the compensation operations are performed too slowly, the touch processing system 190 may switch to performing the compensation operations based on repeated data (e.g., replayed frame) from a previous compensation operation. To perform frame replay, some or all of the image frame may be repeated in its display via the active area 458. The repeated image frame may correspond to retained image statistics data (e.g., APL statistics record, "APL Stats") in a display state buffer 492. The touch processing system 190 may determine when an image frame is at least partially repeated and may selectively reuse some or all of the image frame statistics to continue to compensate for Impedance DTX effects on tactile input sensing. A display state buffer 492 (e.g., a memory) accessible by a touch processing system 190 may store the image frame statistics read from the memory 490. In this way, fewer computing resources and less processing time may be spent determining the frame statistical data for replayed frame data.

One reason for replay may be because the display has not changed. Therefore, no new prediction may be made, and the previous prediction may be used. There may not be any compensation timing limitations. A secondary reason may be that there was an issue in data transport between display and touch processors, leading to a missed image statistic. In these cases, the method may include either to replay the previous prediction or to generate a prediction based on the most probable image Referring back to FIG. 18, when replaying frames, alignment issues may arise and may increase a complexity of aligning frame statistical data with a currently presented image frame. Thus, the image statistics synchronization with touch processor 464 may synchronize replayed frames with one or more repeated DTX estimates 372 and/or one or more repeated image statistics. The image statistics synchronization with touch processor 464 may also synchronize touch scan data with an indication of which image data was displayed at a time of touch scan. Other synchronization operations may also be performed by the image statistics synchronization with touch processor 464 to better align display scan data 192 presented to corresponding precalculated DTX estimate 372 and to corresponding actual touch scan data 198 obtained while that image data was presented. The image statistics synchronization with touch processor 464 may synchronize these operations based on scan time estimates received from the touch scan time estimation processor 462, which may generate scan time estimates indicative of when a touch scan occurred in association with the image data presented on the active area 458.

Referring to FIG. 19, the image statistics synchronization with touch processor 464 operations correspond to operations performed by a timing controller 494 and synchronization circuitry 496. The timing controller 494 may detect a frame and touch operational alignment signal (BSYNC) 498. A processing controller 506 may generate the BSYNC 498 signal and/or a different system may generate the BSYNC 498 signal, such as the scan driver circuitry 76, the data driver circuitry 78, the touch driver interface 108, the touch sense interface 106, a processor of the processor core complex 18, or the like. The timing controller 494 may generate a signal in response to detecting that the BSYNC 498 signal is on and may generate a signal in response to detecting that the BSYNC 498 signal is off. The BSYNC signal 498 may serve to initiate a touch scan. After the touch scan completes, the touch processing system 190 may begin with looking in the queue of the touch processing system 190 to identify and read appropriately synchronized set of image statistics from the buffer 492 (e.g., queue).

At every image frame timing interval, such as an image frame presentation frequency (e.g., 60 hertz (Hz), 120 Hz, 30 Hz, any suitable interval), the timing controller 494 may send an alignment signal 502 to synchronization circuitry 496. The alignment signal 502 may generally indicate an expected frame presentation duration. Based on the generation of the alignment signal 502, the timing controller 494 may generate a change detection scan signal 500 to send to the display state buffer 492. The change detection scan signal 500 may be sent in response to a change in image data to be presented via the active area 458 as opposed to being sent in response to the expected frame presentation duration. In this way, the change detection scan signal 500 may be transmitted fewer times and/or at a slower frequency than the alignment signal 502. The display state buffer 492 may output a corresponding image frame statistic in response to receiving the change detection scan signal 500, which may cause the display state buffer 492 to advance the queue to the subsequent or next-in-queue image statistics. In this way, the timing controller 494 indicates when there is a change in image frame data to be presented and when the next time that image frame is to be presented. Responsive to these indications, the display state buffer 492 may advance the queue to output image statistics from the queue that correspond to the change in image frame data and transmit the updated image statistics to the synchronization circuitry 496. In response to the alignment signal 502, the synchronization circuitry 496 transmits the image statistics from the queue to display-to-touch compensation processor 504, which may include the display-to-touch aggression model 376 and/or touch signal correction processor 466. However, by transmitting the image statistics in response to the alignment signal 502, the timing alignment between image data presentation operations, frame replay operations, and touch scan data correction operations may improve, which may enable more accurate user touch inputs 470.

Continuing on to further describe FIG. 19, the packetized data (e.g., referred to generally herein with image statistics data) transmitted from the image statistics packetization and transport processor 454 may include any suitable data. In some examples, the packetized data may include image data 74 and a frame header, which may include an indication of a frame number (e.g., a count that indicates which of a sequential order of image frames that image frame corresponds to), the on screen timestamp (e.g., a time of a global system clock at which a first pixel of the electronic display 12 is to present a first piece of data of the image frame), an issued timestamp (e.g., when the transaction issued, maybe used in debug operations), an indication of brightness to be used when presenting the image frame (e.g., where brightness changes how much noise is to be compensated via DTX compensation operations and thus said compensation operations may be based on this brightness data), and an indication of a number of tiles 436 associated with the DTX compensation operations (e.g., one or more portions of the APL map 196). It is noted that although the packetized data is described as including the data, in an actual implementation additional or fewer data may be included.

Image statistics data may be collected from a single buffer in memory 490 into a queue of the display state buffer 492. Touch processing system 190 firmware may synchronize APL states from the queue to touch scan data 198 via the display-to-touch compensation processor 504 receiving the various data in response to the synchronization circuitry 496 releasing the data. The timing controller 494 may track display state based on the BSYNC 498 signal. The touch processing system 190 may push the image statistics data to the display-to-touch compensation processor 504 in response to a change in image frame presented via the display, which may be synchronized with touch scan operations.

The frame header may be saved by the image processing system 188 into the memory 490. In addition to storing packetized data (e.g., image frame statistics 510), the memory 490 may also receive indications of frame status 512 updates from the image processing system 188. The memory 490 may expose the indications of the frame status 512 updates to other systems of the electronic device 10, including the touch processing system 190. Some frame status 512 may correspond to a completion status of each row (e.g., row A to row AY, where Y represents a number of rows) and different status updates may indicate which of multiple frame numbers are currently being written to the electronic display 12. The touch processing system 190 may determine to repeat using an amount of computed Impedance DTX error to compensation additional touch scan data 198 (e.g., touch scan data corresponding to a subset scan operation) based on the frame status 512. Furthermore, the memory 490 may also receive doorbell indications 514. The doorbell indications 514 may be used by the touch processing system 190 to help synchronize the statistical data 510 associated with the image frame and touch scan data 198 acquired during presentation of the image frame.

The timing of the operations may be managed by exchanging signals (e.g., interrupt signals) between an issuing side and a receiving side of the electronic display 12. These signals may correspond to the doorbell indications 514.

Indeed, the doorbell indication 514 may indicate when each row of the image frame data has been written to and/or is available for access by the electronic display 12 driving circuitry. An additional doorbell signal may indicate that a last row of the image frame data has been written and/or is available for access. The doorbell indication 514 may correspond to, may be interrupt commands, and/or may be used in conjunction with interrupt commands to control other operations in response to the issuance of the one or more doorbell indications 514.

Furthermore, the timing of operations described herein may be based on a timestamp of a system clock, which may be compared to a timestamp of processing operation to verify the timing of the operations. These timestamps may include the on screen timestamp, the issued timestamp, the touch scan time estimate, or the like. A timing generator may manage the timestamps and/or monitor the timing to determine whether to instruct the data management system to switch between real-time processing or repeated processing operations and/or to better inform the synchronization operations of the timing controller 494.

In some systems, the touch processing system 190 may track frame numbers and thus may detect if an APL stat is dropped in response to a discontinuity in the frame number sequencing being tracked. In some cases, an APL stat may be delayed and/or an image frame presentation may be delayed. This may occur in response to a system load and/or an amount of computing resources being used exceeding a threshold (e.g., relatively high computational resources being consumed). When a respective image statistics data (e.g., APL statistics record) or an image frame is delayed, the touch processing system 190 may replay image statistics and/or an error determination to continue to compensate for Impedance DTX in spite of the delay or the touch processing system 190 may delay compensation operations until the APL stat is received to better align the compensation operations to the image frame presentation.

Figure 20:
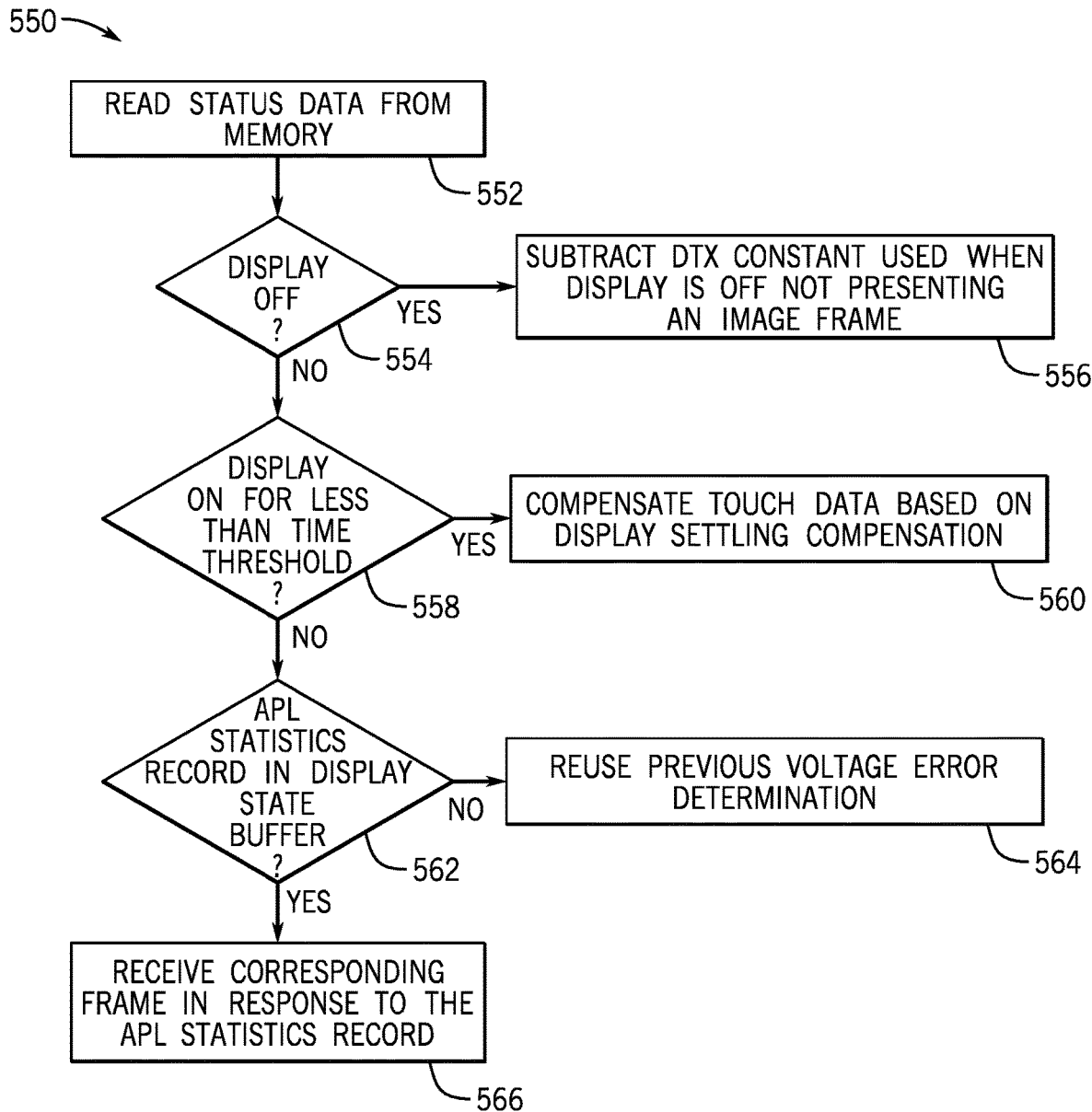
FIG. 20 is a flowchart of a process for operating touch processing circuitry of FIG. 10 to determine whether to reuse a previous voltage error determination (e.g., determination of FIG. 14) or perform another voltage error determination (e.g., determination of FIG. 14) based on image data changing, in accordance with an embodiment.

To further elaborate on touch processing system 190 operations, FIG. 20 is a flowchart 550 of a process for operating touch processing system 190 to determine whether to reuse a previous voltage error determination (e.g., associated with blocks 332-344 of FIG. 14) or perform another voltage error determination (e.g., associated with of blocks 332-344 of FIG. 14) based on image data changing. Although certain operations of the flowchart 550 are presented in a particular order in FIG. 14, it should be understood that additional or fewer operations may be used in a same or different operational order than that presented below. Furthermore, although described herein as performed by the touch processing system 190, it should be understood that other circuitry may perform some or all of the operations described herein.

At block 552, the touch processing system 190 may read status data from the memory 490. At block 554, the touch processing system 190 may determine whether the electronic display 12 is powered off and not presenting an image frame. In response to the electronic display 12 being powered off, the touch processing system 190 may subtract a DTX constant used when the display is off and not presenting an image frame. The DTX constant may be used to remove at least some noise from a touch scan data 198 received while the electronic display 12 is off. At block 558, the touch processing system 190 may determine whether the electronic display 12 has been on for less than a time threshold. The time threshold may correspond to a relatively short time frame corresponding to a warm-up or transition time of the display from off to fully powered on. In response to the electronic display 12 being on for less than the time threshold, at block 560, the touch processing system 190 may compensate touch data based on display settling compensation (e.g., methods of FIG. 14).

In response to the electronic display 12 being on for greater than the time threshold, at block 562, the touch processing system 190 may determine whether the display state buffer 492 includes at least one APL statistics record. The display state buffer 492 may include a queued APL statistics data in response to a change in image data to be used to drive an electronic display 12. When image data is unchanged in its presentation via the electronic display 12, the image processing system 188 may not send a new APL statistics record. In response to determining that the display state buffer 492 does not include at least one APL statistics record, at block 564, the touch processing system 190 may reuse a previous voltage error determination. In response to determining that the display state buffer 492 does include at least one APL statistics record, at block 566, the touch processing system 190 may receive corresponding image data frame in response to the APL statistics record from the display state buffer 492.

Figure 21:
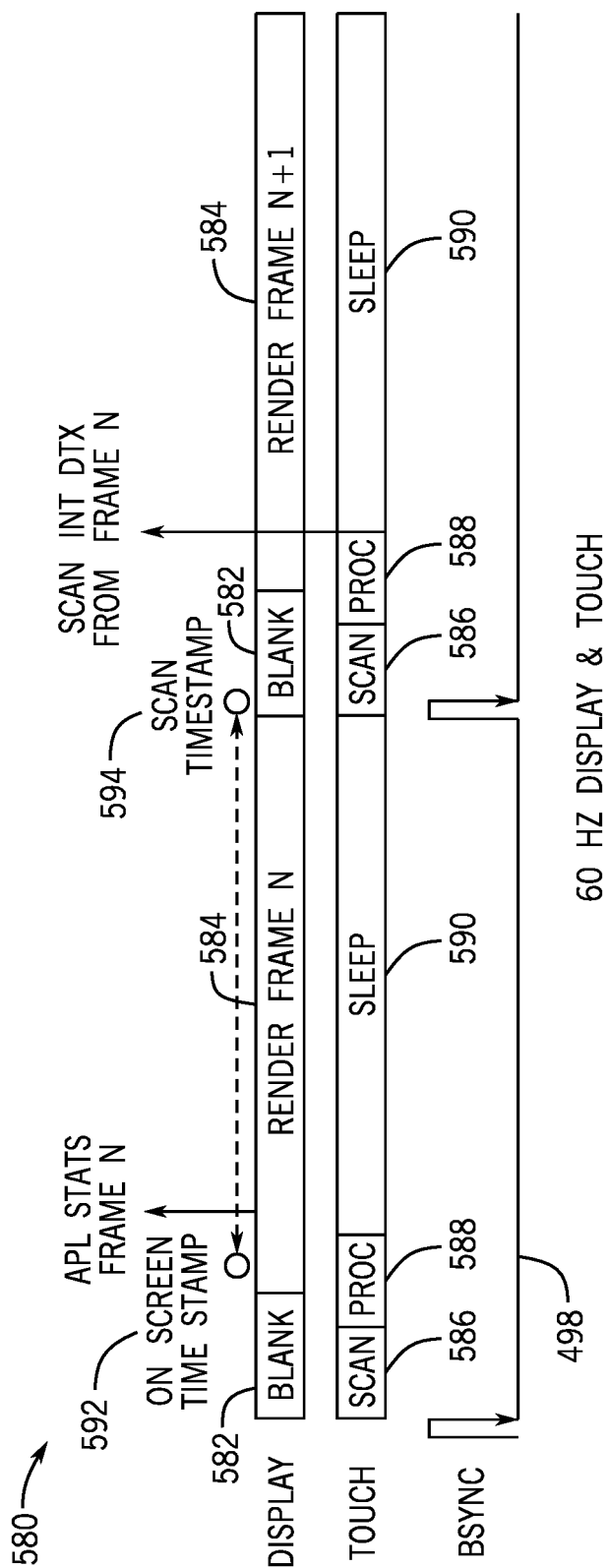
FIG. 21 is a timing diagram corresponding to a process for operating touch processing circuitry of FIG. 10 to synchronize image statistics with touch data, in accordance with an embodiment.

Some of the operations of FIG. 20 may be implemented based on timing signals. To elaborate, FIG. 21 is a timing diagram 580 corresponding to a process for operating touch processing system 190 to synchronize image statistics with touch data. Operations of the timing diagram may align based on the BSYNC 498 signal. The electronic display 12 operations may include a repeating blanking period 582 and a repeating render frame period 584. The touch sensor array 52 (e.g., "TOUCH") operations may include a touch scan period 586, a programming period 588, a sleep period 590 that repeat over time. The touch scan period 586 overlaps with the blanking period 582 of the electronic display 12. The on screen timestamp 592 may correspond to a time at which an image frame is rendered via the electronic display 12. The scan timestamp 594 may correspond to a time at which the touch scan period 586 occurs. The scan timestamp 594 also may indicate an end to the render frame period 584. Firmware of the image processing system 188 may generate the scan timestamp 594 and the on screen timestamp 592 when rendering image data for presentation. The APL statistics may be sent at a time before the frame is rendered. This timing diagram helps illustrate the misalignment that may occur when APL statistics for a first frame are received at a first time different from when the touch scan data 198 is generated from a touch scan associated with the first frame. In some systems, the image processing pipeline 450 may generate image frame statistics 510 that include two timestamps. The first timestamp may be a hardware timestamp that indicates a time at which one or more data of the image frame statistics 510 were generated. The second timestamp may be a firmware configurable offset that is added to the first timestamp. The firmware configurable offset may be tuned based on the integrated image and touch display 186 implementation, a corresponding display pipeline implementation, the SOC 184 implementation, or the like.

In some systems, referring to FIG. 21 and FIG. 19 in parallel, the synchronization circuitry 496 outputs may also be sent to the processing controller 506 as a stream of opaque state data packets for recording, where each opaque state data packet may include the frame status 512, the image frame statistics 510 (e.g., APL map 196), and/or timestamps 592, 594. These state data packets may be recorded in a row of memory associated with validation and manufacturing data. APL map 196 values and/or timestamps 592, 594 used to synchronize these state data packets to touch scan data may also be logged in the processing controller 506. These logging operations may correspond to a continuous logging infrastructure associated with the processing controller 506. The processing controller 506 may perform error logging operations. These error logging operations may include the processing controller 506 determining whether any frame number discontinuities are present and writing an indication of any that exist to memory 20. These error logging operations may include the processing controller 506 determining a time difference between the on screen timestamp and the SCAN INT signal (e.g., SCAN INT DTX from Frame N signal illustrated in FIG. 21) to identify when system overload may be occurring and writing an indication of any that exist to memory 20. Based on the time difference determination, the processing controller 506 may determine when to generate the BSYNC 498 signal for the following Impedance DTX compensation to better align the operations to the detected delays occurring upstream in the image processing pipeline 450. In some systems, BSYNC 498 is not configurable and is used to align touch systems to a timing signal (e.g., is used to initiate touch operations).

Indeed, by using these synchronization and/or modeling systems and methods described herein, the APL statistics may better align with the touch scan data 198 since processing operations may be aligned to the BSYNC 498 signal and/or may be based off of a relatively more accurate Impedance DTX determination based on a multi-phase sensing operation.

When repeating the processing operations, data associated with the previous image frame that is repeated (e.g., replayed frame) may include statistics, cadence of communications (e.g., timing) corresponding to the statistics, or the like. Indeed, geometry configurations that change how the image processing system 188 determines the image frame statistics 510 are not changed between replayed frames. Geometry configurations may include an indication of an active region to use to gather statistical data over, a number of tiles used in the averaging or processing operations, a starting tile indication, a tile size indication, or the like. Repeating the processing operations to compensate for Impedance DTX may not mean that image frame data is also being repeated. Indeed, the image frame itself may change even when the image frame statistics 510 used by the touch processing system 190 to compensate for Impedance DTX is repeated.

In some cases, the timing generator may add intraframe pauses to a control flow of presenting the image frame. An intra-frame pause may be a period of time during which a pixel scanning operation is temporarily stopped. This may electrically permit the display panel to allow time for touching scanning. The insertion of an intraframe pause may delay image data presentation for some pixels. Thus, some timestamps may be modified based on a delay intentionally added for the intra-frame pause(s).

The systems and methods described herein use determinations over regions, such as cells or rows, of data. Although some operations described here referenced operations performed to each cell or each row, it should be understood that these operations may be applied to regions of data or regions of the integrated image and touch display 186. For example, a region of cells may be used when generating the pixel map and/or the APL map. Or, as another example, a region of rows may be used to determine the row-to-row changes in data, such as two-to-two row changes, three-to-three row changes, or the like. This may include averaging image data, gray level data, voltage values determined based on the image data, current values determined based on the image data, or the like, between columns of respective rows, then using the averaged row data to determine the row-to-row difference data for two or more rows.

Impedance DTX may be an effect between any three body conductor as long as there is capacitance among the three. The effect may be the strongest when the unwanted parasitic coupling path is some significant, non-negligible portion of the touch baseline capacitance. Thus, the touch drive electrodes 104 and the touch sense electrodes 102 of the touch layer 130 may be in-plane (as shown in FIGS. 8 and 14) or may be out-of-plane and still be impacted by the Impedance DTX.

Impedance DTX is described herein as compensated for using averaged data. However, Impedance DTX may be compensated using non-averaged data. For example, APL map 196 may include luminance values for each display pixel 54 as opposed to averaged pixel luminance data. Furthermore, any differential computations described herein may include row-to-row difference data, pixel-to-pixel difference data, frame-to-frame difference data, column-to-column difference data, region-to-region difference data, or the like.

Technical effects include using the described systems and methods to improve touch performance in integrated image and touch display when unwanted parasitic coupling is present in the circuitry between three conducting layers. These error determination and cancellation systems and methods may be broadly applied to other systems as well, which may include a range of devices like phones, tablets, watches, desktop computers, laptop computers, or the like. By reducing the error contributions from Impedance DTX based on image frame luminance data, and thus power drawn by pixels, the accuracy and reliability of touch sense data may improve. Furthermore, power consumed by the touch processing system and/or the touch sensing circuitry in the display may be reduced. The systems and methods may also enable relatively high frequency touch operations to occur.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Furthermore, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A system comprising:
an electronic display configured to display image data and obtain touch scan data corresponding to at least one touch sense region of the electronic display;
an image processing system configured to:
receive an image frame data packet comprising the image data; and
determine statistical data corresponding to the at least one touch sense region of the electronic display based on the image data; and
a touch processing system configured to:
determine an estimated charge error expected to effect the touch scan data during a touch sensing operation based on the statistical data and a model of a multi-phase sensing operation;

compensate the touch scan data based on the estimated charge error to obtain compensated touch scan data; and use the compensated touch scan data to determine a proximity of a capacitive object to the at least one touch sense region of the electronic display.

2. The system of claim 1, wherein the image processing system is configured to generate the statistical data at least in part by:

dividing the image data into a plurality of cells of a pixel map respectively corresponding to a plurality of touch sense regions, wherein different portions of the image data correspond to different cells of the plurality of cells, wherein one cell of the plurality of cells comprises at least a portion of the image data, and wherein the plurality of touch sense regions comprise the at least one touch sense region; and determining, for each cell of the plurality of cells, an average of luminance data corresponding to the image data for that respective cell, wherein the averaged luminance data is generated based on the statistical data.

3. The system of claim 2, wherein the touch processing system is configured to compensate the touch scan data using the averaged luminance data and a global brightness value configured to indicate an overall light intensity of the electronic display.

4. The system of claim 3, wherein the touch processing system is configured to compensate the touch scan data at least in part by determining a cathode impedance of the at least one touch sense region using the averaged luminance data and the global brightness value.

5. The system of claim 4, wherein the cathode impedance comprises:

a first impedance corresponding to electronic display components connected directly to a cathode of one or more light emitting diodes (LEDs) of the electronic display; and a second impedance corresponding to the LEDs and electronic drive circuitry configured to control the LEDs, wherein the second impedance varies based on an overall light intensity emitted from the electronic display.

6. The system of claim 1, wherein determining the estimated charge error comprises using the model of the multi-phase sensing operation at least in part by:

determining a cathode impedance based on an average pixel luminance and a display brightness value of the statistical data;

applying the cathode impedance to a display-to-touch aggression model in which the cathode impedance and a sensing capacitor are coupled to a voltage source to charge the sensing capacitor; and determining a first voltage across the sensing capacitor while the voltage source is coupled.

7. The system of claim 6, wherein the model of the multi-phase sensing operation comprises:

decoupling the voltage source from the cathode impedance and the sensing capacitor;

coupling the cathode impedance and the sensing capacitor to an amplifier; and determining a second voltage across the sensing capacitor while the amplifier is coupled.

8. The system of claim 6, wherein parameters of the model of the multi-phase sensing operation are configured to be determined based on material properties of the electronic display and components of the electronic display.

9. The system of claim 8, wherein the parameters are configured to be calibrated based on a process in which one or more devices are used to capture display-to-touch aggression characteristics for one or more display luminance values.

10. The system of claim 1, wherein the statistical data comprises grey scale weighted current values.

11. A non-transitory, tangible, computer-readable medium comprising instructions that, when executed by a processor, are configured to cause a touch processing system to perform operations comprising:

receiving image frame statistics from image processing circuitry;

determining a cathode impedance based on the image frame statistics;

modeling a multi-phase sensing operation to determine a charge error based on the cathode impedance;

receiving touch scan data from an electronic display, wherein the electronic display is configured to obtain the touch scan data;

compensating the touch scan data using the charge error to obtain compensated touch scan data; and using the compensated touch scan data to determine a proximity of a capacitive object to a touch sense region of the electronic display.

12. The computer-readable medium of claim 11, wherein compensating the touch scan data comprises operations to:

determine a voltage error based on the charge error; and subtract the voltage error from the touch scan data to obtain the compensated touch scan data.

13. The computer-readable medium of claim 12, wherein receiving the image frame statistics comprises reading a buffer memory configured to store the image frame statistics after the image processing circuitry writes the image frame statistics to the buffer memory.

14. The computer-readable medium of claim 12, wherein the image frame statistics comprises grey scale weighted current values.

15. The computer-readable medium of claim 11, wherein the operations comprise:

receiving additional touch scan data corresponding to a next touch sensing operation performed while a second image frame is being presented via the electronic display; and compensating the additional touch scan data based on replaying the image frame statistics, wherein the image frame statistics corresponds to previously presented image data of an image frame, and wherein replaying the image frame statistics is based on a synchronization circuitry and an alignment signal processed by a timing controller.

16. A device comprising:

an electronic display;

a first processing system coupled to the electronic display, wherein the first processing system is configured to:

receive an image frame data packet corresponding to a first image frame; and generate statistical data based on the image frame data packet;

a memory coupled to the first processing system, wherein the memory receives the statistical data from the first processing system; and a second processing system coupled to the memory and to the electronic display, wherein the second processing system is configured to:

read the statistical data from the memory;

receive touch scan data from the electronic display;

determine an amount of error expected to effect touch scan data during a touch sensing operation based on the statistical data and a display-to-touch aggression model;

adjust the touch scan data based on the amount of error and the statistical data to generate compensated touch scan data; and determine a proximity of a capacitive object to at least one touch sense region of the electronic display based on the compensated touch scan data.

17. The device of claim 16, wherein the statistical data comprises an average pixel luminance (APL) map of cells, a doorbell signal, and a frame status, wherein cells of the APL map of cells are configured to respectively correspond to different touch sense regions of the electronic display, and wherein each of the cells is configured to comprise a pixel luminance value that is an average of current values for each pixel associated with a touch sense region corresponding to that cell.

18. The device of claim 17, wherein the display-to-touch aggression model is associated with a first charge error and a second charge error expected to occur in response to a tactile input, wherein the first charge error corresponds to a charging operation performed at a first time to a sensing capacitance based on a system resistance, and wherein the second charge error corresponds to discharging operation at a second time to the sensing capacitance based on the system resistance.

19. The device of claim 18, wherein the second processing system is configured to synchronize the statistical data associated with the first image frame and the touch scan data acquired during presentation of the first image frame based on the doorbell signal.

20. The device of claim 18, wherein the second processing system is configured to determine to repeat using the amount of error to compensate additional touch scan data based on the frame status.

* * * * *